United States Patent
Shen et al.

(10) Patent No.: US 11,336,435 B2
(45) Date of Patent: *May 17, 2022

(54) METHOD, APPARATUS, AND SYSTEM FOR PROCESSING TWO-DIMENSIONAL BARCODES

(71) Applicant: Advanced New Technologies Co., Ltd., George Town (KY)

(72) Inventors: Lingnan Shen, Hangzhou (CN); Ge Chen, Hangzhou (CN); Yanghui Liu, Hangzhou (CN); Huifeng Jin, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/341,188

(22) Filed: Jun. 7, 2021

(65) Prior Publication Data

US 2021/0297247 A1 Sep. 23, 2021

Related U.S. Application Data

(63) Continuation of application No. 17/035,359, filed on Sep. 28, 2020, now Pat. No. 11,032,070, which is a
(Continued)

(30) Foreign Application Priority Data

Dec. 14, 2016 (CN) .......................... 201611154671.9

(51) Int. Cl.
*H04L 9/08* (2006.01)
*G06K 19/06* (2006.01)
(Continued)

(52) U.S. Cl.
CPC ............ *H04L 9/0825* (2013.01); *G06F 21/36* (2013.01); *G06K 19/06037* (2013.01);
(Continued)

(58) Field of Classification Search
CPC ... H04L 9/0825; H04L 9/3247; H04L 63/108; H04L 63/123; H04L 63/126; G06K 19/06037
(Continued)

(56) References Cited

U.S. PATENT DOCUMENTS 6,381,696 B1 4/2002 Doyle
9,923,879 B1 3/2018 Ziraknejad et al.
(Continued)

FOREIGN PATENT DOCUMENTS

CN 1744135 3/2006
CN 101030278 9/2007
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Dant B Shaifer Harriman
(74) *Attorney, Agent, or Firm* — Fish & Richardson P.C.

(57) ABSTRACT

This specification describes techniques for processing service requests. An electronic credential request including a user identifier is received from a client. An electronic credential that corresponds to the user identifier and a user public key that corresponds to the user are retrieved. A hash operation is performed on the user public key and the electronic credential by using a hash algorithm to obtain a hash value that is signed within a predetermined time period. Server signature information is generated using the hashed
(Continued)

credential, and transmitted with the electronic credential to the client. The server signature information is cryptographically verifiable by the client and enables the client to generate a two-dimensional barcode based on the electronic credential.

19 Claims, 15 Drawing Sheets

Related U.S. Application Data continuation of application No. 16/802,640, filed on Feb. 27, 2020, now Pat. No. 10,790,970, which is a continuation of application No. 16/384,607, filed on Apr. 15, 2019, now Pat. No. 10,581,597, which is a continuation of application No. PCT/CN2017/114382, filed on Dec. 4, 2017.

(51) Int. Cl.
G06K 19/10 (2006.01)
H04L 9/32 (2006.01)
H04L 29/06 (2006.01)
G06F 21/36 (2013.01)

(52) U.S. Cl.
CPC ............ *G06K 19/10* (2013.01); *H04L 9/3247* (2013.01); *H04L 63/108* (2013.01); *H04L 63/123* (2013.01); *H04L 63/126* (2013.01)

(58) Field of Classification Search
USPC .......................................................... 713/171
See application file for complete search history.

(56) References Cited

U.S. PATENT DOCUMENTS

| | | | |
|---|---|---|---|
| 10,601,828 B2 | 3/2020 | Avetisov et al. | |
| 10,645,068 B2 | 5/2020 | Bonnell et al. | |
| 2003/0144968 A1 | 7/2003 | Katayama et al. | |
| 2011/0087596 A1 | 4/2011 | Dorsey | |
| 2011/0103586 A1* | 5/2011 | Nobre | H04L 9/3247 |
| | | | 380/270 |
| 2012/0308003 A1 | 12/2012 | Mukherjee | |
| 2013/0125223 A1* | 5/2013 | Sorotokin | H04L 9/3213 |
| | | | 726/6 |
| 2013/0179681 A1 | 7/2013 | Benson et al. | |
| 2014/0254796 A1* | 9/2014 | Li | H04L 9/3247 |
| | | | 380/246 |
| 2015/0095999 A1 | 4/2015 | Toth | |
| 2015/0288670 A1* | 10/2015 | Bhooshan | H04W 12/06 |
| | | | 726/7 |
| 2016/0042352 A1* | 2/2016 | Motoki | G06Q 20/3274 |
| | | | 235/380 |
| 2016/0241405 A1* | 8/2016 | Jeong | H04L 63/0428 |
| 2017/0076522 A1 | 3/2017 | Ives-Halperin et al. | |
| 2017/0244676 A1 | 8/2017 | Edwards | |
| 2018/0331833 A1* | 11/2018 | Tomlinson | H04L 9/3231 |
| 2018/0337951 A1* | 11/2018 | Agarwal | H04L 9/088 |
| 2020/0067907 A1* | 2/2020 | Avetisov | H04L 9/0825 |
| 2020/0366484 A1* | 11/2020 | So | H04L 9/083 |

FOREIGN PATENT DOCUMENTS

| | | |
|---|---|---|
| CN | 102842081 | 12/2012 |
| CN | 103812837 | 5/2014 |
| CN | 103854061 | 6/2014 |
| CN | 104836776 | 8/2015 |
| CN | 105515783 | 4/2016 |
| CN | 105530099 | 4/2016 |
| CN | 105763323 | 7/2016 |
| CN | 105978688 | 9/2016 |
| CN | 106899570 | 6/2017 |
| JP | 2004295649 | 10/2004 |
| JP | 2006039728 | 2/2006 |
| RU | 2195021 | 12/2002 |
| TW | 201604804 | 2/2016 |

OTHER PUBLICATIONS

European Extended Search Report in European Patent Application No. 17880448.0, dated Sep. 27, 2019, 9 pages.
International Search Report and Written Opinion issued in International Application No. PCT/CN2017/114382 dated Feb. 26, 2018, 9 pages (with English translation).
Nakamoto, "Bitcoin: A Peer-to-Peer Electronic Cash System," www.bitcoin.org, 2005, 9 pages.
PCT International Preliminary Report on Patentability in International Application No. PCT/CN2017/114382, dated Jun. 18, 2019, 10 pages (with English translation).
PCT Written Opinion of the International Searching Authority in International Application No. PCT/CN2017/114382, dated Feb. 26, 2018, 9 pages (with English translation).

* cited by examiner

METHOD, APPARATUS, AND SYSTEM FOR PROCESSING TWO-DIMENSIONAL BARCODES

CROSS-REFERENCE TO RELATED APPLICATIONS

This application is a continuation of and claims the benefit of priority of U.S. patent application Ser. No. 17/035,359, filed on Sep. 28, 2020, which is a continuation of and claims the benefit of priority of U.S. patent application Ser. No. 16/802,640, filed Feb. 27, 2020, which is a continuation of U.S. patent application Ser. No. 16/384,607, filed Apr. 15, 2019, which is a continuation of PCT Application No. PCT/CN2017/114382, filed on Dec. 4, 2017, which claims priority to Chinese Patent Application No. 201611154671.9, filed on Dec. 14, 2016, and each application is hereby incorporated by reference in its entirety.

TECHNICAL FIELD

The present invention relates to the field of information processing technologies, and in particular, to a method, an apparatus, and a system for processing two-dimensional barcodes.

BACKGROUND

Currently, there are some credential verification application scenarios in daily work and life, for example, an identity card, a bankcard, a bus ticket, a concert ticket, and an access control card. In some application scenarios, credential verification only needs to be completed by using specific entities, for example, a bus ticket, a concert ticket, and an access control card. For some credential verification scenarios with relatively high security requirements, a specific entity and private information need to be used together to complete verification, for example, a bankcard and a home/company fingerprint access.

In practice, in an application scenario with credential verification that only needs to be completed by using a specific entity, credential verification can be completed by obtaining a corresponding specific entity. For example, a user can buy a paper bus ticket or a paper concert ticket from a ticket window, and can get on the bus or go to a concert after verification is completed at the ticket barrier. This verification mode depends on a specific entity (a bus ticket or a concert ticket), and requires the user to carry the specific entity. However, if the specific entity is lost or damaged, a process of deregistering or post-registering the specific entity is complex.

For an application scenario with a relatively high security requirement, security can be ensured by an additional security authentication auxiliary device, for example, a secure keyboard or a fingerprint recognition device. As such, usage costs are increased. Although this method can prevent private information leakage, a threat of private information leakage still exists.

In both of the previous two application scenarios, there is a problem that credential verification is less convenient with relatively low security, and costs of a credential publishing party are relatively high. To alleviate the previous problem, a user in the existing technology can buy an electronic credential online. A string of random codes are recorded in the electronic credential, and during credential verification, verification can be completed by verifying a random code in the electronic credential, thereby improving convenience and security of credential verification, and reducing publishing costs of the credential publishing party. However, a static random code is used in the electronic credential, and if the electronic credential is copied or stolen through photographing, security of the electronic credential cannot be ensured.

SUMMARY

In view of this, the present invention provides a method, an apparatus, and a system for processing two-dimensional barcodes, and is mainly intended to alleviate an existing-technology problem that an electronic credential is generated based on a static random code, and once the electronic credential is copied or stolen through photographing, security of the electronic credential cannot be ensured.

According to a first aspect of the present invention, the present invention provides a method for processing two-dimensional barcodes, including the following: receiving, by a server, an electronic credential acquisition request sent by client software, where the electronic credential acquisition request includes a user identifier; obtaining an electronic credential that corresponds to the user identifier, and signing the electronic credential and a user public key of the client software by using a server private key to obtain server signature information; and sending the server signature information and the electronic credential to the client software, so that the client software verifies the server signature information, and generates a two-dimensional barcode based on the electronic credential so that a credential verification end device verifies the electronic credential included in the two-dimensional barcode, where the credential verification end device is configured to generate the electronic credential based on the user identifier.

According to a second aspect of the present invention, the present invention provides a method for processing two-dimensional barcodes, including the following: receiving, by client software, server signature information and an electronic credential that are sent by a server, where the server signature information is obtained by the server by signing the electronic credential and a user public key of the client software by using a server private key; verifying the server signature information to obtain an electronic credential; obtaining a user key that corresponds to the user public key, and signing the electronic credential by using the user key to obtain client software signature information; and generating a two-dimensional barcode based on predetermined security information, the client software signature information, the server signature information, the electronic credential, and the user public key, so that a credential verification end device verifies the electronic credential included in the two-dimensional barcode based on the predetermined security information and the user public key, where the predetermined security information has validity duration, and the credential verification end device is configured to generate an electronic credential based on a user identifier.

According to a third aspect of the present invention, the present invention provides a method for processing two-dimensional barcodes, including the following: obtaining, by a credential verification end device, a two-dimensional barcode in client software, where the two-dimensional barcode is generated by the client software based on predetermined security information, client software signature information, server signature information, an electronic credential, and a user public key, the client software signature information is obtained by the client software by signing the electronic credential, and the server signature information is obtained by a server by signing the electronic credential and the user public key; verifying validity duration of the predetermined security information, and verifying the client software signature information and the server signature information; if verification on each of the predetermined security information, the client software signature information, and the server signature information succeeds, obtaining a service validity time included in the electronic credential for verification; and if verification on the service validity time included in the electronic credential succeeds, determining that verification on the electronic credential succeeds.

According to a fourth aspect of the present invention, the present invention provides a server, including the following: a receiving unit, configured to receive an electronic credential acquisition request sent by client software, where the electronic credential acquisition request includes a user identifier; a first acquisition unit, configured to obtain an electronic credential that corresponds to the user identifier received by the receiving unit; a signing unit, configured to sign the electronic credential and a user public key of the client software by using a server private key to obtain server signature information; and a sending unit, configured to send the server signature information obtained by the signing unit and the electronic credential obtained by the first acquisition unit to the client software, so that the client software verifies the server signature information within a validity time of a user key, and generates a two-dimensional barcode based on the electronic credential so that a credential verification end device verifies the electronic credential included in the two-dimensional barcode, where the credential verification end device is configured to generate the electronic credential based on the user identifier.

According to a fifth aspect of the present invention, the present invention provides client software, including the following: a first receiving unit, configured to receive server signature information and an electronic credential that are sent by a server, where the server signature information is obtained by the server by signing the electronic credential and a user public key of the client software by using a server private key; a signature verification unit, configured to verify the server signature information to obtain an electronic credential; an acquisition unit, configured to obtain a user key that corresponds to the user public key; a signing unit, configured to sign the electronic credential by using the user key obtained by the acquisition unit to obtain client software signature information; and a generation unit, configured to generate a two-dimensional barcode based on predetermined security information, the client software signature information, the server signature information, the electronic credential, and the user public key, so that a credential verification end device verifies the electronic credential included in the two-dimensional barcode based on the predetermined security information and the user public key, where the predetermined security information has validity duration, and the credential verification end device is configured to generate an electronic credential based on a user identifier.

According to a sixth aspect of the present invention, the present invention provides a credential verification end device, including the following: a first acquisition unit, configured to obtain a two-dimensional barcode in client software, where the two-dimensional barcode is generated by the client software based on predetermined security information, client software signature information, server signature information, an electronic credential, and a user public key, the client software signature information is obtained by the client software by signing the electronic credential, and the server signature information is obtained by a server by signing the electronic credential and the user public key; a first verification unit, configured to verify validity duration of the predetermined security information obtained by the first acquisition unit; a second verification unit, configured to verify the client software signature information and the server signature information; a third verification unit, configured to obtain a service validity time included in the electronic credential for verification when verification of the first verification unit on the predetermined security information succeeds, verification of the second verification unit on each of the client software signature information and the server signature information succeeds; and a determining unit, configured to determine that verification on the electronic credential succeeds when verification of the third verification unit on the service validity time included in the electronic credential succeeds.

According to a seventh aspect of the present invention, the present invention provides a system for processing two-dimensional barcodes, and the system includes the following: client software, configured to send an electronic credential acquisition request to a server, where the electronic credential acquisition request includes a user identifier; the server, configured to receive the electronic credential acquisition request sent by the client software, and obtain an electronic credential from a credential verification end device based on the user identifier; and the credential verification end device, configured to receive and respond to request information for obtaining an electronic credential sent by the server, and send the electronic credential to the server, where the server is further configured to receive the electronic credential sent by the credential verification end device, sign the electronic credential and a user public key of the client software to obtain server signature information, and send the server signature information and the electronic credential to the client software; the client software is configured to receive the server signature information and the electronic credential that are sent by the server, verify the server signature information to obtain the electronic credential, obtain a user key that corresponds to the user public key, sign the electronic credential by using the user key to obtain client software signature information, and generate a two-dimensional barcode based on predetermined security information, the client software signature information, the server signature information, the electronic credential, and the user public key; and the credential verification end device is configured to obtain the two-dimensional barcode in the client software, verify validity duration of the predetermined security information, and verify the client software signature information and the server signature information; and if verification on each of the predetermined security information, the client software signature information, and the server signature information succeeds, obtain a service validity time included in the electronic credential for verification, and if verification on the service validity time included in the electronic credential succeeds, determine that verification on the electronic credential succeeds.

According to the previous technical solutions, and according to the method, apparatus, and system for processing two-dimensional barcodes provided in the present invention, after receiving the electronic credential acquisition request sent by the client software, the server signs the electronic credential and the user public key of the client software by using the server private key to obtain the server signature information, and sends the server signature information and the electronic credential to the client software. The client software receives the server signature information and the electronic credential that are sent by the server, verifies the server signature information, after the verification on the signature information succeeds, signs the electronic credential, and generates the two-dimensional barcode based on the predetermined security information, the client software signature information, the server signature information, the electronic credential, and the user public key. After obtaining the two-dimensional barcode, the credential verification end device can verify the server signature information, the client software signature information, and the predetermined security information in the two-dimensional barcode to determine whether the electronic credential is tampered with in a transmission process, to ensure security of the electronic credential in a use process.

The description is merely an overview of the technical solutions of the present invention. To more clearly understand the technical means of the present invention to implement the content of the specification, and to make the previous and other objectives, features, and advantages of the present invention more comprehensible, the following lists specific implementations of the present invention.

BRIEF DESCRIPTION OF DRAWINGS

By reading detailed descriptions of the following preferred implementations, a person of ordinary skill in the art understands various other advantages and benefits. Accompanying drawings are merely used to show objectives of the preferred implementations, but are not considered as a limitation on the present invention. In addition, the same reference numeral is used to indicate the same part in all accompanying drawings. In the accompanying drawings.

DESCRIPTION OF IMPLEMENTATIONS

The following describes the example implementations of the present disclosure in more detail with reference to the accompanying drawings. Although the accompanying drawings show example implementations of the present disclosure, it should be understood that the present disclosure can be implemented in various forms, and shall not be limited by the implementations described here. Instead, these implementations are provided to make a person skilled in the art more thoroughly understand the present disclosure and the scope of the present disclosure.

To alleviate an existing-technology problem that electronic credential information in a two-dimensional barcode can be easily leaked, implementations of the present invention provide a method for processing two-dimensional barcodes. The method is implemented through cooperation of a server, client software, and a credential verification end device. The credential verification end device can at least generate and transmit data, to transmit a generated electronic credential to the server, and can obtain data and verify data, to obtain an electronic credential from a two-dimensional barcode in the client software and verify whether the electronic credential is correct. The server can at least transmit and receive data, to receive an electronic credential sent by the credential verification end device, and send the electronic credential to the client software, to implement data transmission. The client software can at least exchange data with the server, to receive an electronic credential sent by the server, and can generate an image, to generate a two-dimensional barcode etc. based on the electronic credential information.

Figure 1:
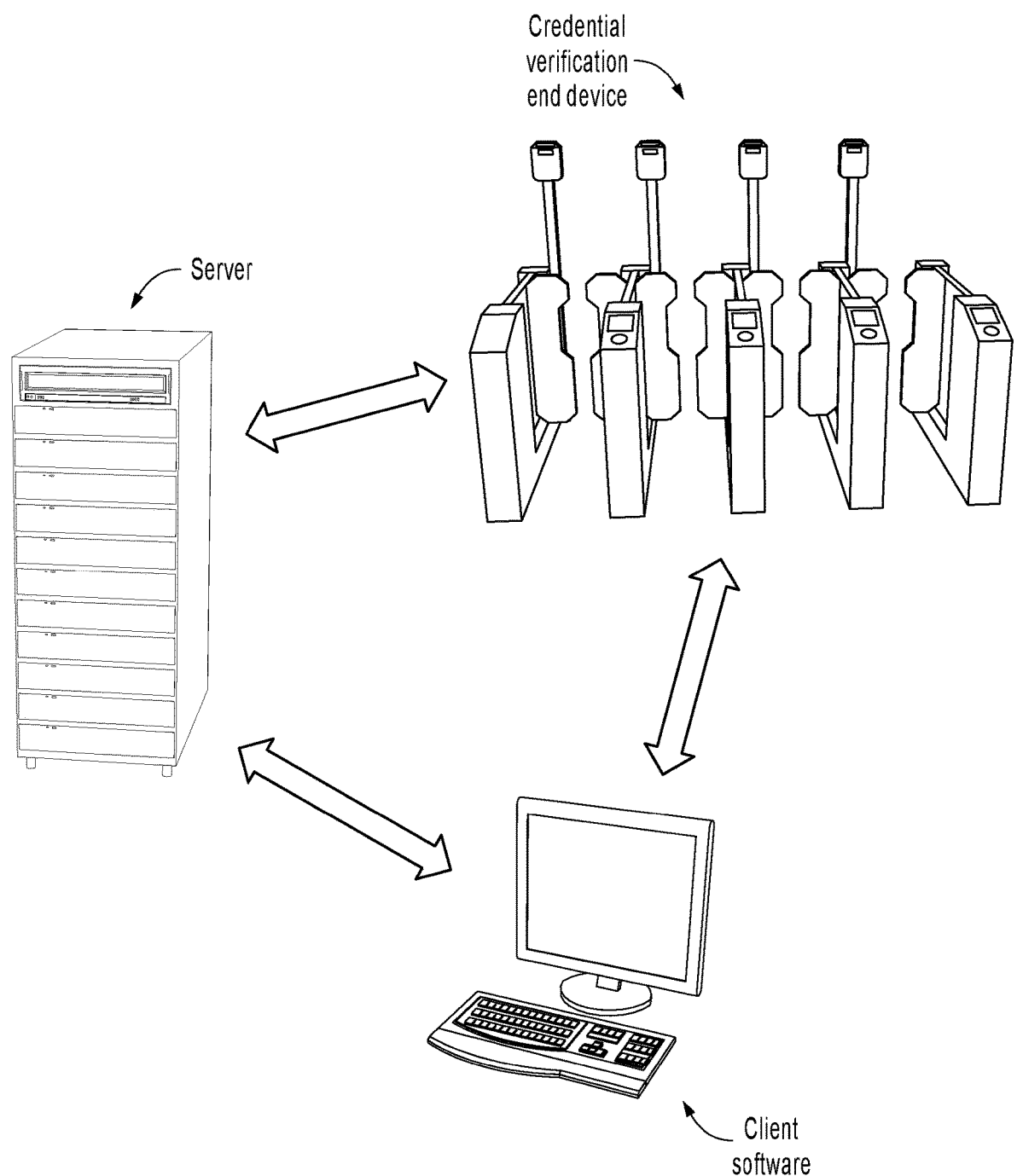
FIG. 1 is a framework diagram illustrating interaction between client software, a server, and a credential verification end device, according to an implementation of the present invention.

Before the method in the implementations is described, for ease of understanding, a framework diagram illustrating interaction between client software, a server, and a credential verification end device, according to an implementation of the present invention is first provided, as shown in FIG. 1. In the implementation of the present invention, after generating an electronic credential based on a user identifier (such as an identity card number, a mobile number, or an email address), the credential verification end device sends the electronic credential to the server, and the server has access permission to the electronic credential generated by the credential verification end device. After receiving an electronic credential acquisition request from the client software, the server sends the electronic credential to the client software, so that the client software generates a two-dimensional barcode based on the electronic credential for the credential verification end device to verify.

It is worthwhile to note that, in this implementation of the present invention, a description is made by using an example that an electronic credential is carried in a two-dimensional barcode. However, theoretically, the electronic credential can also depend on another medium, for example, client software that has an NFC capability such as an SE capability or an HCE capability. In the implementation of the present invention, a description is made by using an example that an electronic credential is carried in a two-dimensional barcode, because for an electronic credential user and the credential verification end device, the two-dimensional barcode has relatively low requirements on hardware devices used and the hardware devices are relatively universal. However, it should be clear that such a description method is not intended to impose a limitation that an electronic credential can only be carried by using a two-dimensional barcode.

Figure 2:
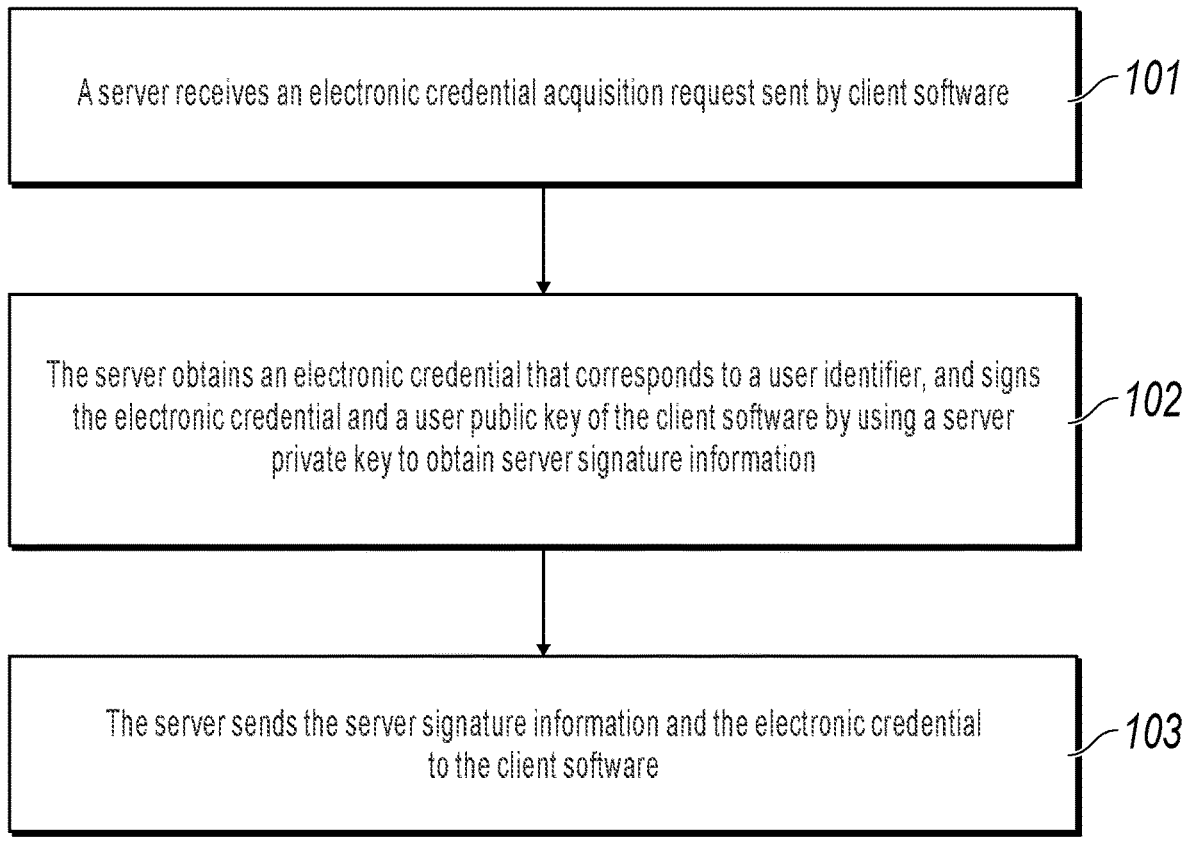
FIG. 2 is a flowchart illustrating a first method for processing two-dimensional barcodes, according to an implementation of the present invention.

The following first provides a method for processing two-dimensional barcodes implemented on a server side based on the schematic diagram shown in FIG. 1. As shown in FIG. 2, the method includes the following steps.

101. A server receives an electronic credential acquisition request sent by client software.

After successfully logging in to the server, the client software sends an electronic credential acquisition request to the server, where the electronic credential acquisition request includes a user identifier, so that the server searches for corresponding electronic credential information based on the user identifier. In a specific implementation process, the electronic credential can include but is not limited to the following content: an electronic credential that corresponds to an air ticket, a bus ticket, a train ticket, a concert ticket, a bankcard, an access control card, park admission tickets, an identity card, a merchant coupon, a membership card, a driving license, a driving license access control card, or a bus card.

In a specific implementation process, the client software is an application (APP) installed in an electronic device or a website. Before the client software interacts with the server, the client software can register with the server based on a user identifier, and the user identifier can include but is not limited to a user identity card, a real name consistent with the identity card, a mobile number, an email address, an account name, etc. In the registration process, a login password for logging in to the server can be set, and after registration and successful login, the client software can be connected to and communicate with the server.

102. The server obtains an electronic credential that corresponds to a user identifier, and signs the electronic credential and a user public key of the client software by using a server private key to obtain server signature information.

The server described in this implementation of the present invention does not generate an electronic credential. After receiving the electronic credential acquisition request sent by the client software, the server obtains the electronic credential that corresponds to the user identifier from a credential verification end device that generates the electronic credential. The server acts as a bridge between an electronic credential using party (client software) and an electronic credential verification end device (credential verification end device), and is responsible for forwarding the electronic credential generated by the credential verification end device to the electronic credential using party. It is worthwhile to note that, on the premises that the server described in this implementation of the present invention satisfies national regulatory requirements, the server needs to be authorized by the credential verification end device to access the credential verification end device.

To prevent the electronic credential from being tampered with in a transmission process of the server and the client software, before the server responds to the electronic credential acquisition request sent by the client software, the server needs to sign the user public key of the client software by using the server private key to obtain the server signature information. In this implementation of the present invention, the user public key of the client software is signed so that the client software and the server can verify each other's identities, perform security authentication on identity information, and ensure that the information in a data transmission process is not tampered with. The server signs the electronic credential by using the server private key so that integrity of the original electronic credential can be determined.

In addition, when signing the user public key and the electronic credential, the server can further use the server signature information obtained when the server signs the electronic credential and the user public key as attribute information of the generated two-dimensional barcode when the client software subsequently generates the two-dimensional barcode, to ensure that the electronic credential transmitted by the client software is sent by the server, verified by the client software, and is authorized and reliable. As such, the electronic credential cannot be forged or repudiated.

103. The server sends the server signature information and the electronic credential to the client software.

As such, the client software verifies the signed electronic credential, and generates a two-dimensional barcode based on the electronic credential, so that the credential verification end device verifies the electronic credential included in the two-dimensional barcode. The credential verification end device is configured to generate the electronic credential based on the user identifier.

According to the method for processing two-dimensional barcodes provided in this implementation of the present invention, after receiving the electronic credential acquisition request sent by the client software, the server signs the electronic credential and the user public key of the client software by using the server private key to obtain the server signature information, and sends the server signature information and the electronic credential to the client software. The client software receives the server signature information and the electronic credential that are sent by the server, verifies the server signature information, after the verification on the signature information succeeds, signs the electronic credential, and generates the two-dimensional barcode based on the predetermined security information, the client software signature information, the server signature information, the electronic credential, and the user public key. After obtaining the two-dimensional barcode, the credential verification end device can verify the server signature information, the client software signature information, and the predetermined security information in the two-dimensional barcode to determine whether the electronic credential is tampered with in a transmission process, to ensure security of the electronic credential in a use process.

As a further description of the method shown in FIG. 1, to ensure validity of the user identifier of the client software and ensure that the user identifier of the client software is not tampered with in a content transmission process, in step 102, the electronic credential and the user public key of the client software can be signed by using the server private key in the following methods, etc. For example:

Method 1: The server allocates a user signature key to the electronic credential, and signs the electronic credential and a first user public key by using the server private key, where the allocated user signature key includes the first user public key.

When the server receives the electronic credential acquisition request sent by the client software, if no user public key of the client software is obtained from the electronic credential acquisition request, the server temporarily allocates a pair of user signature keys to the electronic credential to authenticate the user identifier of the client software and therefore ensure that the electronic credential is not tampered with, where the allocated user signature keys include one first user public key and one first user private key; and signs the first user private key by using the server private key to perform security authentication on the server signature information after the server signature information is received.

Because the user signature keys are temporarily allocated by the server to the electronic credential, if the user signature keys are not obtained by the client software, the server signature information in the server cannot be verified. To alleviate the previous problem, if the server signs the electronic credential and the first user public key of the client software by using Method 1, when the server sends the server signature information and the electronic credential to the client software, the server needs to synchronously send the user signature keys allocated to the electronic credential to the client software, so that the client software can verify the server signature information based on the user signature keys.

In a specific implementation process, after receiving the user signature keys temporarily allocated by the server to the electronic credential, and verifying the server signature information based on the user signature keys, the client software can directly discard the user signature keys, or can use the user signature keys as common user keys and user public keys of the client software. Implementations are not limited in this implementation of the present invention.

Method 2: The server obtains a second user public key sent by the client software, and signs the second user public key and the electronic credential by using the server private key.

In this implementation, to identify the identity of the client software, when sending the electronic credential acquisition request to the server, the client software synchronously sends the second user public key of the client software to the server, so that the server performs identity authentication on the client software, and the server signs the second user public key and the electronic credential of the client software by using the server private key. After receiving the signed second user public key and the signed electronic credential, the client software can obtain the electronic credential information only after successful signature verification to ensure that the electronic credential is not tampered with.

It is worthwhile to note that, the first user public key and the second user public key described in this implementation of the present invention are used to distinguish different user public keys of the client software. The "first" and "second" have no other meanings, and are not intended to limit the number, the priority, etc. of user public keys. A method for naming the user public key in the client software is not limited in this implementation of the present invention.

For ease of description, in the subsequent description in the implementation of the present invention, a description is made by using an example that a user public key and a user private key are asymmetric keys. However, it should be clear that the user public key and the user private key are not limited to asymmetric keys, but can be symmetric keys. Implementations are not limited in this implementation of the present invention.

To facilitate understanding of a signature process of the server, the following uses an example that the server signs a user public key and an electronic credential for description. A specific process includes the following: After obtaining the user public key and the electronic credential, the server can perform a hash operation on the user public key and the electronic credential by using a hash algorithm to obtain a hash value, and then sign the hash value by using the server private key to obtain the server signature information. An algorithm (such as a hash operation) used in a signature process is not limited in this implementation of the present invention.

After signing the electronic credential and the user public key, the server sends the electronic credential, the signed user public key, and the signed electronic credential to the client software, so that the client software verifies the server signature information and ensures that the electronic credential is not tampered with by a malicious user in a data transmission process. In addition, the server further needs to broadcast the public key corresponding to the server private key that is used when the server obtains the signature information, so that the client software and the credential verification end device receive the public key broadcast by the server, and use the server public key to verify the signature information.

Further, the server described in this implementation of the present invention serves as a bridge that carries the client software and a credential information verification party. The server is responsible for authenticating validity of a user, and in addition, the server can further verify validity of using an electronic credential. In specific use processes, the electronic credentials correspond to different service types, and different service types are limited by using different service specifications. For example, when the electronic credential is an air ticket, the air ticket service includes a departure time of an airplane (this application scenario can only be a scenario with an airplane taking off on time without delay). Alternatively, when the electronic credential is a concert ticket, the ticket service also includes a start time, an entrance time, etc. of the concert. Therefore, in this implementation of the present invention, before obtaining the corresponding electronic credential based on the user identifier, the server needs to parse the electronic credential acquisition request, obtain a service validity time included in the electronic credential acquisition request, and verify whether the service validity time complies with the service specification. When the service validity time complies with the service specification, the server obtains the electronic credential that corresponds to the user identifier. When the service validity time does not comply with the service specification, the server returns, to the client software, prompt information indicating that no corresponding electronic credential is available.

For better understanding, the following describes the service validity time and service specifications with examples. For example, assume that an electronic credential is a bus ticket service, a time for a credential verification end device to presell bus tickets is 7 days, and a current date is Nov. 1, 2016. A user sends an electronic credential acquisition request to the server by using the client software on Nov. 1, 2016, a service validity time included in the request is to Nov. 20, 2016, and a maximum validity time of an electronic credential generated by the credential verification end device is to Nov. 8, 2016. Therefore, the server can determine that the service validity time does not comply with a service specification. The previous description is merely an example. This implementation of the present invention imposes no limitation on a service type of an electronic credential, a service validity time, a service specification, etc.

Further, in step 102, the electronic credential that corresponds to the user identifier can be obtained in the following methods but not limited to the methods. For example:

Method 1: After the credential verification end device generates the electronic credential based on the user identifier, the electronic credential synchronized by the credential verification end device is received.

In this implementation, after generating the electronic credential, the credential verification end device actively sends the generated electronic credential to the server. In a specific implementation process, to facilitate management of a plurality of electronic credentials, the server can locally generate a predetermined list, where the predetermined list is used to record a mapping relationship between a user identifier and an electronic credential. After receiving the electronic credential synchronized by the credential verification end device, the server records a newly received mapping relationship between an electronic credential and a user identifier in the predetermined list. After sending an electronic credential to the client software, the server can delete the electronic credential that has been successfully sent from the predetermined list, to reduce resources occupied by the server.

Method 2: Request information for obtaining an electronic credential is sent to the credential verification end device based on the user identifier, to obtain the electronic credential.

In this implementation, the server is used for forwarding. The server requests an electronic credential from the credential verification end device based on the user identifier in the electronic credential acquisition request only when receiving the electronic credential acquisition request sent by the client software, and then forwards the obtained electronic credential to the client software. A method for obtaining an electronic credential by the server is not limited in this implementation of the present invention.

Figure 3:
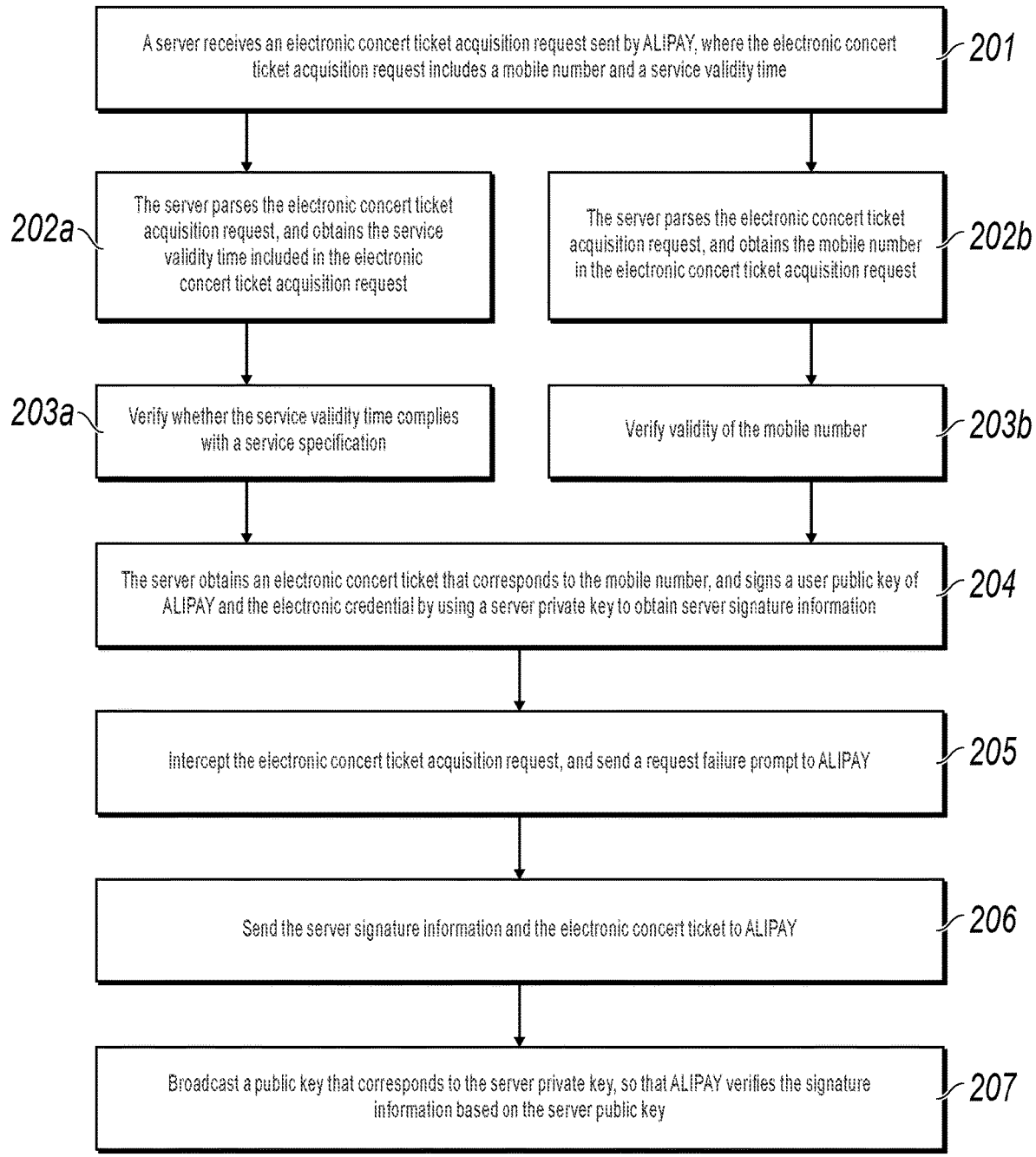
FIG. 3 is a flowchart illustrating a second method for processing two-dimensional barcodes, according to an implementation of the present invention.

Further, as a further description and an extension of the previous method, an implementation of the present invention further provides a method for processing two-dimensional barcodes. In the method, for ease of description, a description is mainly made by using an example that the client software is ALIPAY and the electronic credential is an electronic concert ticket. It should be clear that such a description method is not intended to impose a limitation that the client software described in this implementation of the present invention can only be ALIPAY. As shown in FIG. 3, the method includes the following steps.

201. A server receives an electronic concert ticket acquisition request sent by ALIPAY, where the electronic concert ticket acquisition request includes a mobile number and a service validity time.

In practice, the service validity time can be a booking time of an electronic concert ticket, or can be a start time of the electronic concert ticket, or can be any time unrelated to the electronic concert ticket. The service validity time is not limited in this implementation of the present invention.

202a. The server parses the electronic concert ticket acquisition request, and obtains the service validity time included in the electronic concert ticket acquisition request.

For example, the service validity time in the request is the start time of the concert: 16:00 on Sep. 20, 2016, and the current date is Sep. 1, 2016.

203a. Verify whether the service validity time complies with a service specification.

If the service validity time complies with the service specification, step 204 is performed. If the service validity time does not comply with the service specification, step 205 is performed.

In this implementation of the present invention, the electronic concert ticket is obtained for the following scenario: When a paper ticket for the concert is lost or damaged, the concert can be entered by verifying the electronic concert ticket, without post-registering a paper concert ticket. It reduces a tedious process of post-registering the ticket. In this example, it can be specified that the service specification is that an electronic concert ticket can be obtained within 30 days before the opening of the concert, or an electronic concert ticket can be obtained within half an hour after the opening of the concert. Step 202b can be performed provided that the service validity time complies with the service specification. The validity time described in step 201 is the start time of the concert on Sep. 20, 2016 that complies with the service specification, so step 202b is performed.

202b. The server parses the electronic concert ticket acquisition request, and obtains the mobile number in the electronic concert ticket acquisition request.

203b. Verify validity of the mobile number.

If the mobile number is valid, step 204 is performed. If the mobile number is invalid, step 205 is performed.

In the present step, it is verified whether the mobile number in the request is consistent with the mobile number in the server.

It is worthwhile to note that, when step 202a and step 202b are performed, there is no sequence between the two steps. In addition, subsequent steps continue to be performed only after verification on the service validity time and verification on the user identifier (a mobile number) succeed.

204. The server obtains an electronic concert ticket that corresponds to the mobile number, and signs a user public key of ALIPAY and the electronic credential by using a server private key to obtain server signature information.

Based on different service types, the electronic credentials have corresponding details. An electronic concert ticket is used as an example. The electronic concert ticket includes a concert location, a stand, a specific seat number, a concert name, a price, etc. Implementations are not limited in this implementation of the present invention.

205. Intercept the electronic concert ticket acquisition request, and send a request failure prompt to ALIPAY.

206. Send the server signature information and the electronic concert ticket to ALIPAY.

207. Broadcast a public key that corresponds to the server private key, so that ALIPAY verifies the signature information based on the server public key.

As an extension to the method shown in FIG. 3, after the electronic device (for example, the mobile phone) installed with ALIPAY is lost, the user can switch the mobile phone, and after successfully logging in to ALIPAY, continue to use the electronic credential, preventing deregistration, post-registration, etc. after the paper credential is lost. Such an application scenario can be applied only after ALIPAY has performed successful signature verification by using the user private key, the server public key, and the electronic credential. If ALIPAY does not verify the server signature information, ALIPAY needs to verify the server signature information based on the server public key and obtain the electronic credential after the verification succeeds. In an optional implementation of the present invention, to further determine that the electronic credential is not leaked, after the server sends the server signature information and the electronic credential to the client software, verification validity duration for the server public key can be set. As such, the client software has to complete verification on the server signature information within a specified time limit. If the verification validity duration for the server public key expires, the server signature information cannot be verified.

Figure 4:
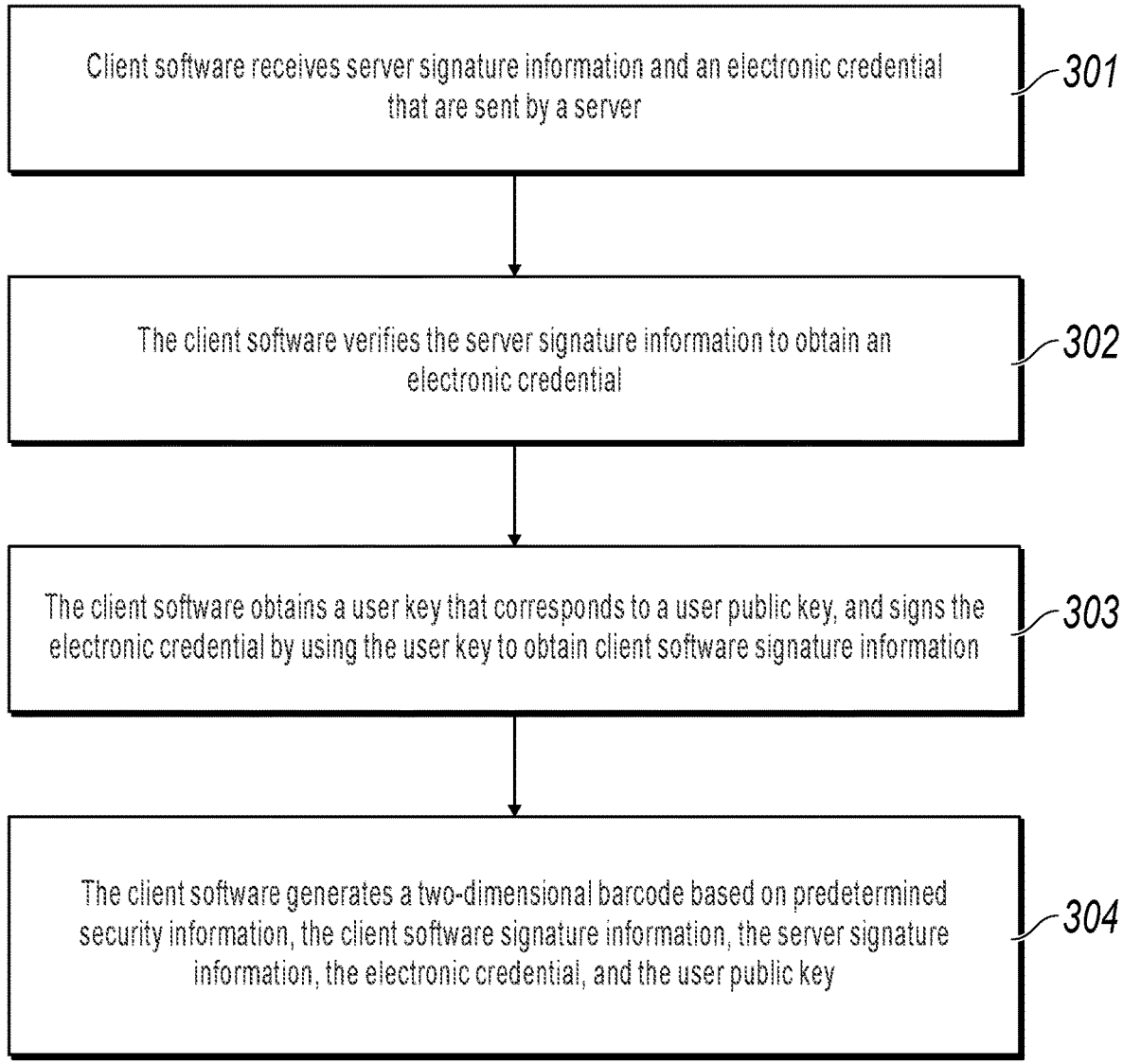
FIG. 4 is a flowchart illustrating a third method for processing two-dimensional barcodes, according to an implementation of the present invention.

Further, an implementation of the present invention further provides a method for processing two-dimensional barcodes. The method is applied to the client software side shown in FIG. 1. As shown in FIG. 4, the method includes the following steps.

301. The client software receives server signature information and an electronic credential that are sent by a server.

After the client software successfully logs in to the server by using a user account name and a login password, the client software sends an electronic credential acquisition request to the server. The server responds to the electronic credential acquisition request. To prevent the electronic credential from being tampered with in a transmission process, the server sends the server signature information and the electronic credential to the client software, to verify validity of the identity of the client software. The server signature information is obtained by the server by signing the electronic credential and the user public key of the client software by using a server private key. For related descriptions about obtaining the server signature information, references can be made to the detailed descriptions in the previous implementation. Details are omitted for simplicity in this implementation of the present invention.

302. The client software verifies the server signature information to obtain an electronic credential.

Figure 5:
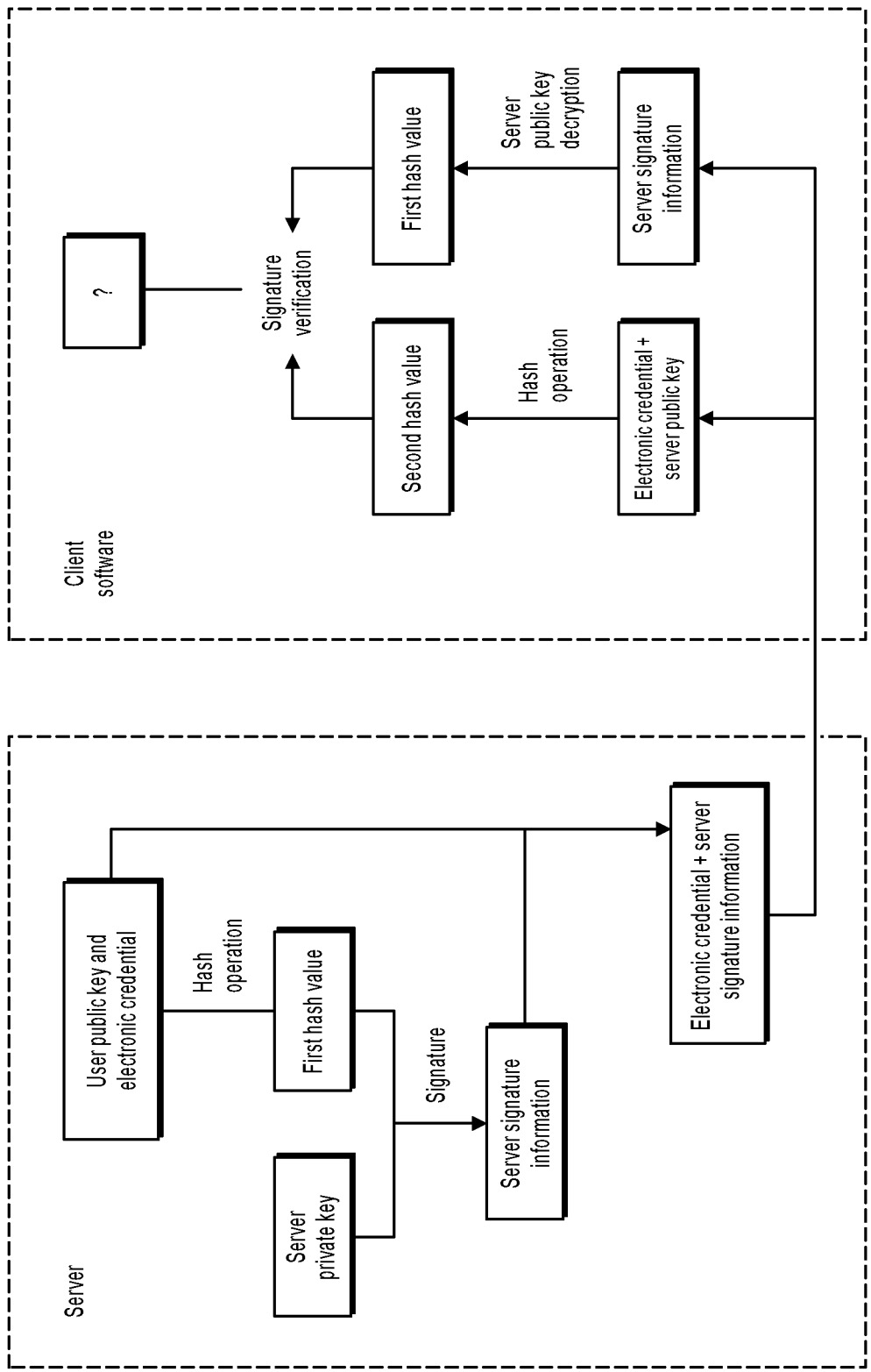
FIG. 5 is a schematic diagram illustrating signing and verification on the signature, according to an implementation of the present invention.

For example, server signature information obtained by signing a user public key and an electronic credential by a server, and verification on the server signature information performed by the client software are used as an example for detailed description. FIG. 5 is a schematic diagram illustrating signing and verification on the signature, according to an implementation of the present invention. After obtaining the user public key and the electronic credential, the server performs a hash operation on the user public key and the electronic credential by using the hash algorithm to obtain a first hash value, and encrypts the first hash value by using the server private key to obtain server signature information. The server sends the server signature information and the electronic credential to the client software. After receiving the server signature information and the electronic credential, the client software extracts the electronic credential, and performs a hash operation on the electronic credential to obtain a second hash value. In addition, the client software uses a server public key to decrypt the server signature information to obtain a first hash value, and compares the first hash value obtained through decryption with the second hash value obtained through calculation. If the first hash value is the same as the second hash value, it indicates that the electronic credential is not tampered with in a transmission process, and the electronic credential can be directly used after the electronic credential is obtained. If the first hash value is different from the second hash value, it indicates that the electronic credential is tampered with in a data transmission process, and there can be a risk of information leakage. It is worthwhile to note that FIG. 5 is only an example, and specific content of the server signature information is not limited.

303. The client software obtains a user key that corresponds to a user public key, and signs the electronic credential by using the user key to obtain client software signature information.

The client software generates an electronic credential that is carried in a two-dimensional barcode. To prevent the electronic credential from being illegally tampered with and to prevent the electronic credential information from being leaked, the client software needs to sign the electronic credential by using a user private key, to obtain the client software signature information. When the client software uses the client software signature information as attribute information of the generated two-dimensional barcode, the credential verification end device can verify the client software signature information, and further authenticates validity of the client software.

For a specific signature implementation method, references can be made to the detailed description in FIG. 5. Details are omitted for simplicity in this implementation of the present invention.

304. The client software generates a two-dimensional barcode based on predetermined security information, the client software signature information, the server signature information, the electronic credential, and the user public key.

When the client software and the credential verification party perform short distance data (electronic credential) transmission, to ensure security of transmitting the electronic credential, authentication information can be added to the generated two-dimensional barcode, and the authentication information can include but is not limited to the client software signature information, the server signature information, and the predetermined security information. The credential verification end device can verify the client software signature information, to determine that the electronic credential that needs to be verified is sent by the client software. In addition, the credential verification end device can verify the server signature information to determine that the electronic credential in the two-dimensional barcode is sent by the server, to ensure that the electronic credential is not tampered with.

In this implementation of the present invention, the predetermined security information is used as a dynamic implementation of the two-dimensional barcode, and is used as a credential for establishing "credible" data transmission between the client software and the credential verification end device. Before receiving the two-dimensional barcode sent by the client software, the credential verification end device verifies validity and security of the predetermined security information to ensure security of the electronic credential sent by the client software. The predetermined security information can include but is not limited to the following content: dynamic password information, time information, random code information, etc. Implementations are not limited in this implementation of the present invention.

For example, as described here, the current system time is used for the predetermined security information. If the client software generates a two-dimensional barcode at 08:00, it can be determined that the predetermined security information is 08/00. If the client software generates the two-dimensional barcode at 10:21, it can be determined that the predetermined security information is 10/21. The previous example is described by using the predetermined security information as the current system time. However, it should be clear that such a description method is not intended to impose a limitation that the predetermined security information described in this implementation of the present invention can only be the current system time of the client software.

It is worthwhile to note that, when the two-dimensional barcode is generated, the user public key of the client software is not broadcast, and instead, the user public key is directly used as attribute information of the generated two-dimensional barcode. It can effectively reduce additional overheads and costs of the client software.

According to the method for processing two-dimensional barcodes provided in this implementation of the present invention, after receiving the electronic credential acquisition request sent by the client software, the server signs the electronic credential and the user public key of the client software by using the server private key to obtain the server signature information, and sends the server signature information and the electronic credential to the client software. The client software receives the server signature information and the electronic credential that are sent by the server, verifies the server signature information, after the verification on the signature information succeeds, signs the electronic credential, and generates the two-dimensional barcode based on the predetermined security information, the client software signature information, the server signature information, the electronic credential, and the user public key. After obtaining the two-dimensional barcode, the credential verification end device can verify the server signature information, the client software signature information, and the predetermined security information in the two-dimensional barcode to determine whether the electronic credential is tampered with in a transmission process, to ensure security of the electronic credential in a use process.

In an implementation of the present invention, when obtaining the user key that corresponds to the user public key, the client software receives a user signature key that is sent by the server and that is allocated to the electronic credential, where the user signature key includes a first user public key and a first user key, the user key and the user public key are asymmetric keys, and the client software obtains the first user key in the user signature key that is allocated by the server to the electronic credential. In another implementation of the present invention, when obtaining the user key that corresponds to the user public key, the client software can obtain a second user key that is generated by the client software and that corresponds to a user public key. A method for the client software to obtain the user key is not limited in this implementation of the present invention.

Further, when verifying the server signature information, the method includes the following: receiving and storing a server public key broadcast by the server, and verifying the server signature information based on the server public key and the electronic credential.

When determining that the server signs the second user public key generated by the client software, the client software verifies the server signature information based on the server public key, the electronic credential, and the first user public key.

When determining that the server signs the first user public key allocated by the server to the electronic credential, the client software verifies the server signature information based on the server public key, the electronic credential, and the second user public key. For a process that the client software verifies the server signature information, references can be made to the detailed description in FIG. 5. Implementations are not limited in this implementation of the present invention.

It is worthwhile to note that, when sending the electronic credential to the client software, the server needs to sign the electronic credential and the user public key to obtain the server signature information, so that when the client software generates the two-dimensional barcode subsequently, the server signature information can be used as attribute information of the generated two-dimensional barcode. The user uses a user private key to sign information sent by the server, to ensure correctness of the original information of the electronic credential, and ensure that the user public key is valid and reliable as verified and cannot be forged or repudiated.

Further, there can be a plurality of user signature keys (including the first user key generated by the client software, and the second user key allocated by the server to the electronic credential) in the client software. Therefore, the client software can sign the electronic credential by using any user private key that matches the client software. For example, the client software can sign the electronic credential by using the first user key, or can sign the electronic credential by using the second user key. Implementations are not limited in this implementation of the present invention.

To further ensure security of the electronic credential, when the client software generates the two-dimensional barcode, the client software also uses the client software signature information in the process. As such, the credential verification end device verifies the client software signature information, to ensure that the electronic credential is generated by the client software and the client software is authorized and reliable to use the electronic credential, and the electronic credential cannot be forged or repudiated. The two-dimensional barcode can be generated based on the predetermined security information, the client software signature information, the server signature information, the electronic credential, and the user public key in the following method: setting validity duration of the predetermined security information, and generating the two-dimensional barcode based on the predetermined security information, the client software signature information, the server signature information, the electronic credential, the user public key, the validity duration of the predetermined security information, and the user identifier.

It is worthwhile to note that, in this implementation of the present invention, when generating the two-dimensional barcode, the client software needs to use the user identifier as attribute information of the generated two-dimensional barcode. This can be applied to an application scenario with a credential verification end device requiring a user real-name system. For example, when an electronic credential is a credential that corresponds to an air ticket, a bus ticket, a train ticket, a bankcard, etc., when the credential verification end device verifies such an electronic credential, a user identity card entity can be used to check a real-name system condition, to assist in completing verification, to satisfy a requirement in some application scenarios that require a real-name system.

In an optional solution in this implementation of the present invention, in some high-security scenarios, when a two-dimensional barcode is generated, to prevent the two-dimensional barcode from being used by a malicious user when a mobile phone or a tablet computer is lost or within a short period of time when the two-dimensional barcode is cracked, a biometric feature of a person using the electronic credential can be added to the two-dimensional barcode. For example, a biometric feature such as a fingerprint of the person using the electronic credential is included in the two-dimensional barcode. When the credential verification end device verifies the two-dimensional barcode, verification on the biometric feature of the person is needed to further ensure security of the electronic credential.

Figure 6:
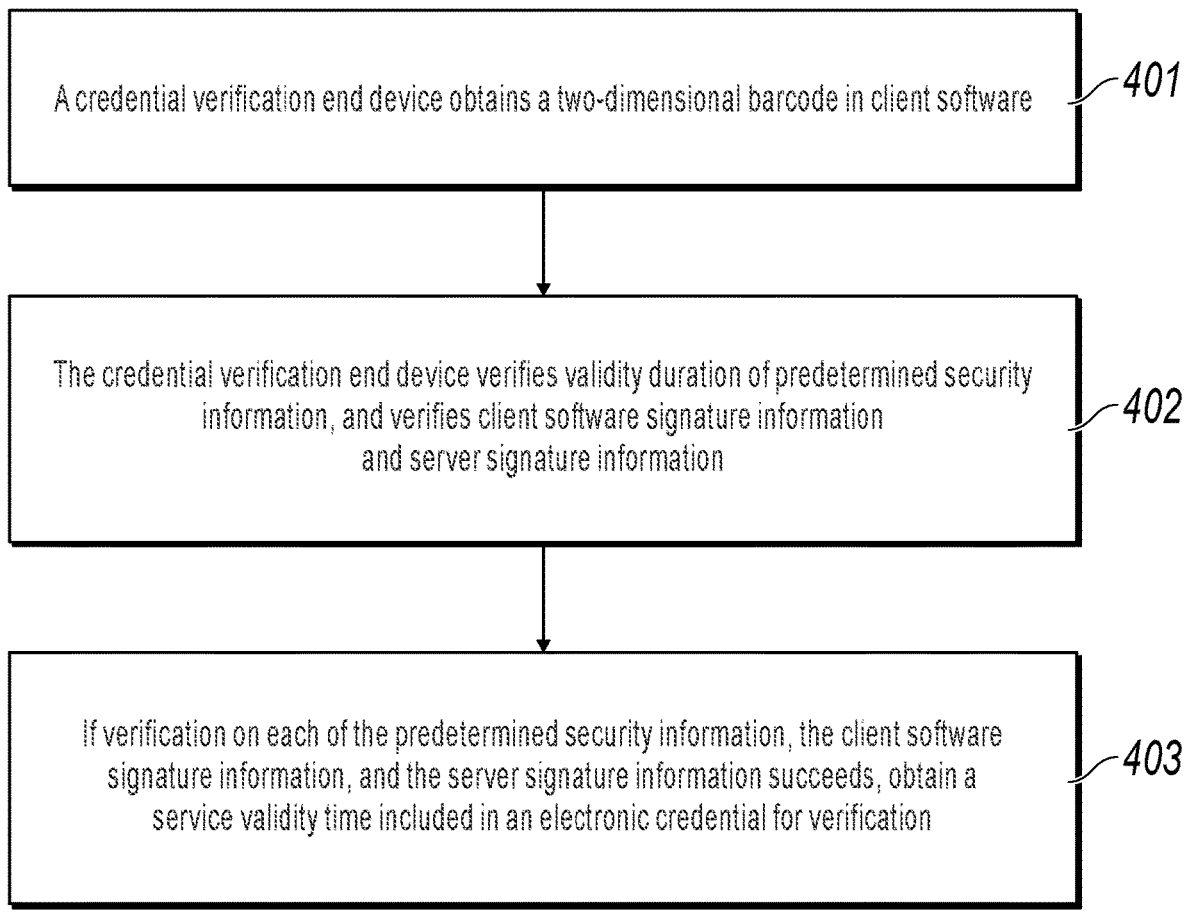
FIG. 6 is a flowchart illustrating a fourth method for processing two-dimensional barcodes, according to an implementation of the present invention.

Further, in the previous implementation, specific functions and specific implementations of the server and the client software for processing the two-dimensional barcode are described in detail. The credential verification end device shown in FIG. 1 needs to perform verification on the generated electronic credential that depends on the two-dimensional barcode. The following provides a method for processing two-dimensional barcodes. The method is applied to a credential verification end device. As shown in FIG. 6, the method includes the following steps.

401. The credential verification end device obtains a two-dimensional barcode in client software.

The two-dimensional barcode is generated by the client software based on predetermined security information, client software signature information, server signature information, an electronic credential, and a user public key, the client software signature information is obtained by the client software by signing the electronic credential, and the server signature information is obtained by the server by signing the electronic credential and the user public key.

The credential verification end device can obtain the two-dimensional barcode in the client software in the following method, etc. For example, the two-dimensional barcode is obtained by using a predetermined data acquisition instruction. Methods concerning the predetermined data acquisition instruction include a scanning method, a data transmission method, a key triggering method, a voice triggering method, and a method of sliding along a track.

In the predetermined data acquisition instruction method in this implementation of the present invention, predetermined data acquisition instruction methods other than the scanning method need to be set before data transmission. For example, a data transmit end shaking method is set as follows: shaking twice in the same single direction, shaking left and right twice, and shaking up and down three times. The key triggering method includes the following: The credential verification end device monitors a triggering state of a predetermined key, and the predetermined key can be a physical key, or can be a virtual key. When the client software triggers the predetermined key, the credential verification end device can obtain a two-dimensional barcode displayed in the client software. If the client software is touchscreen client software, after the credential verification end device predetermines the method of sliding along a track, the credential verification end device monitors a sliding state of a touchscreen in the client software, and when the client software user triggers a sliding operation on the screen, obtains the two-dimensional barcode. The predetermined data acquisition instruction is described above, and a type of the predetermined data acquisition instruction in practice is not limited in this implementation of the present invention.

402. The credential verification end device verifies validity duration of predetermined security information, and verifies client software signature information and server signature information.

The credential verification end device parses the obtained two-dimensional barcode, obtains the predetermined security information and the electronic credential that are included in the two-dimensional barcode, and verifies validity duration of the predetermined security information and validity of the service validity time in the electronic credential. For example, assume that the predetermined security information is the current system time of the client software, the predetermined security information is 10/21, and the validity duration of the predetermined security information is 60 s. The credential verification end device obtains a time difference between the current system time and the predetermined security information, and determines whether the validity duration is greater than 60 s. If it is determined that the validity duration is greater than 60 s, the credential verification end device determines that the two-dimensional barcode is invalid. The previous description is an example. Alternatively, the validity duration of the predetermined security information can be set to two minutes, etc. The validity duration of the predetermined security information is not limited in this implementation of the present invention.

For implementations for the credential verification end device to verify the client software signature information and the server signature information, references can be made to the method shown in FIG. 5. Details are omitted for simplicity in this implementation of the present invention.

403. If verification on each of the predetermined security information, the client software signature information, and the server signature information succeeds, obtain a service validity time included in an electronic credential for verification.

For verification on the service validity time, references can be made to related descriptions in the previous implementations. Details are omitted for simplicity in this implementation of the present invention.

404. If verification on the service validity time included in the electronic credential succeeds, determine that verification on the electronic credential succeeds.

According to the method for processing two-dimensional barcodes provided in this implementation of the present invention, after receiving an electronic credential acquisition request sent by the client software, the server signs the electronic credential and the user public key of the client software by using the server private key to obtain the server signature information, and sends the server signature information and the electronic credential to the client software. The client software receives the server signature information and the electronic credential that are sent by the server, verifies the server signature information, after the verification on the signature information succeeds, signs the electronic credential, and generates the two-dimensional barcode based on the predetermined security information, the client software signature information, the server signature information, the electronic credential, and the user public key. After obtaining the two-dimensional barcode, the credential verification end device can verify the server signature information, the client software signature information, and the predetermined security information in the two-dimensional barcode to determine whether the electronic credential is tampered with in a transmission process, to ensure security of the electronic credential in a use process.

Further, as an extension to the method shown in FIG. 6, in this implementation of the present invention, steps of methods are all performed based on the electronic credential generated by the credential verification end device. Therefore, in this implementation of the present invention, before the two-dimensional barcode in the client software is obtained, the credential verification end device generates the electronic credential based on the user identifier, and an occasion of generating the electronic credential can include but is not limited to the following content. For example, after the user purchases a ticket from the ticket window, a ticket system generates electronic credential information in addition to generating a paper credential, and feeds back the electronic credential information to the server. As such, the server can send the electronic credential to the client software. Alternatively, after the user purchases an electronic ticket on the ticket website, an electronic credential that corresponds to the electronic ticket is generated and is then sent to the server. In this implementation of the present invention, there is no limitation on whether the credential verification end device provides a paper ticket after generating an electronic credential. In this implementation of the present invention, the electronic credential is intended to prevent complex post-registration operations for a paper credential after the paper credential is lost or damaged. In addition, security of the electronic credential can be ensured when the credential verification end device obtains an electronic credential that is carried in a dynamic two-dimensional barcode.

After the credential verification end device generates the electronic credential, the corresponding electronic credential can be synchronized to the server based on the user identification information so that the client software can obtain the electronic credential from the server. In another implementation of the present invention, after receiving request information for obtaining an electronic credential sent by the server, the credential verification end device sends the electronic credential to the server, where the request information for obtaining an electronic credential includes the user identifier.

Further, the credential verification end device can verify the client software signature information and the server signature information in the following method, etc. For example, the credential verification end device obtains a user public key included in the two-dimensional barcode, and verifies the client software signature information based on the user public key and the electronic credential. The credential verification end device receives and stores a server public key corresponding to a server private key and broadcast by the server; and verifies the server signature information based on the server public key and the electronic credential.

Further, in some application scenarios with relatively high security requirements, the client software uses the user identifier information as attribute information of the generated two-dimensional barcode, so that the credential verification end device authenticates user identity information. For example, the client software uses the user identity card as the attribute information of the generated two-dimensional barcode. The credential verification end device parses the two-dimensional barcode, obtains a user identifier included in the credential verification end device, and verifies the user identifier. If the credential verification end device determines that the verification on the user identifier succeeds, the credential verification end device determines that verification on the electronic credential succeeds. For example, when the electronic credential in the two-dimensional barcode is a train ticket, when the user uses the electronic train ticket to pass through the station turnstile, the identity card of the user can be verified at the same time, to complete verification on the electronic credential.

Further, when the credential verification end device verifies the content in the two-dimensional barcode, regardless of an amount of content included in the two-dimensional barcode, as long as content included in the two-dimensional barcode is successfully verified by the credential verification end device, it indicates that the electronic credential verification succeeds. If one item or some items included in the two-dimensional barcode fail to be verified, it indicates that the electronic credential verification fails. For example, assume that when the two-dimensional barcode includes the predetermined security information, the client software signature information, the server signature information, and the user identifier, it can be determined that the electronic credential is successfully verified only after verification on each of the predetermined security information, the client software signature information, the server signature information, and the user identifier succeeds.

As described above, the credential verification end device verifies the electronic credential that is carried in the two-dimensional barcode, and the convenience and security of the electronic credential in daily work and life can be seen from the process. The previous description is described by using an example that the client software includes one type of electronic credential. In practice, the client software can include a plurality of types of electronic credentials. The electronic credentials can be separately recorded in different dynamic two-dimensional barcodes, or can be recorded in the same two-dimensional barcode. Implementations are not limited in this implementation of the present invention. The electronic credential can replace the entity credential information in the existing technology, preventing information leakage in the entity credential, and alleviating cumbersome deregistration or post-registration steps when the entity credential is lost. According to the method in this implementation of the present invention, a user only needs to carry one terminal device (mobile phone) installed with the client software when going out, and does not need to carry any entity credential.

For example, user A carries only one mobile phone installed with client software, and takes a bus from home to the company at 8:00 in the morning. The user can travel smoothly with a two-dimensional barcode of a bus electronic credential in the client software. After arriving, the user can enter the company with an access control electronic credential, and can punch in by using an electronic credential. At 11:00 am, user A needs to go to a bank to process a banking service, and the electronic identity card and the electronic bankcard can be used to process the service. At 17:00, user A needs to travel to the train station for a business trip. When user A is passing through the turnstile, the real-name verification can be performed by using the electronic identity card and the electronic train ticket. After the verification succeeds, the user can take the train. The previous secure method for processing two-dimensional barcodes is used once the electronic credential is verified. The previous example is intended to illustrate convenience and security brought by the electronic credential for life and work, and is not intended to limit a specific application scenario of the electronic credential.

Figure 7:
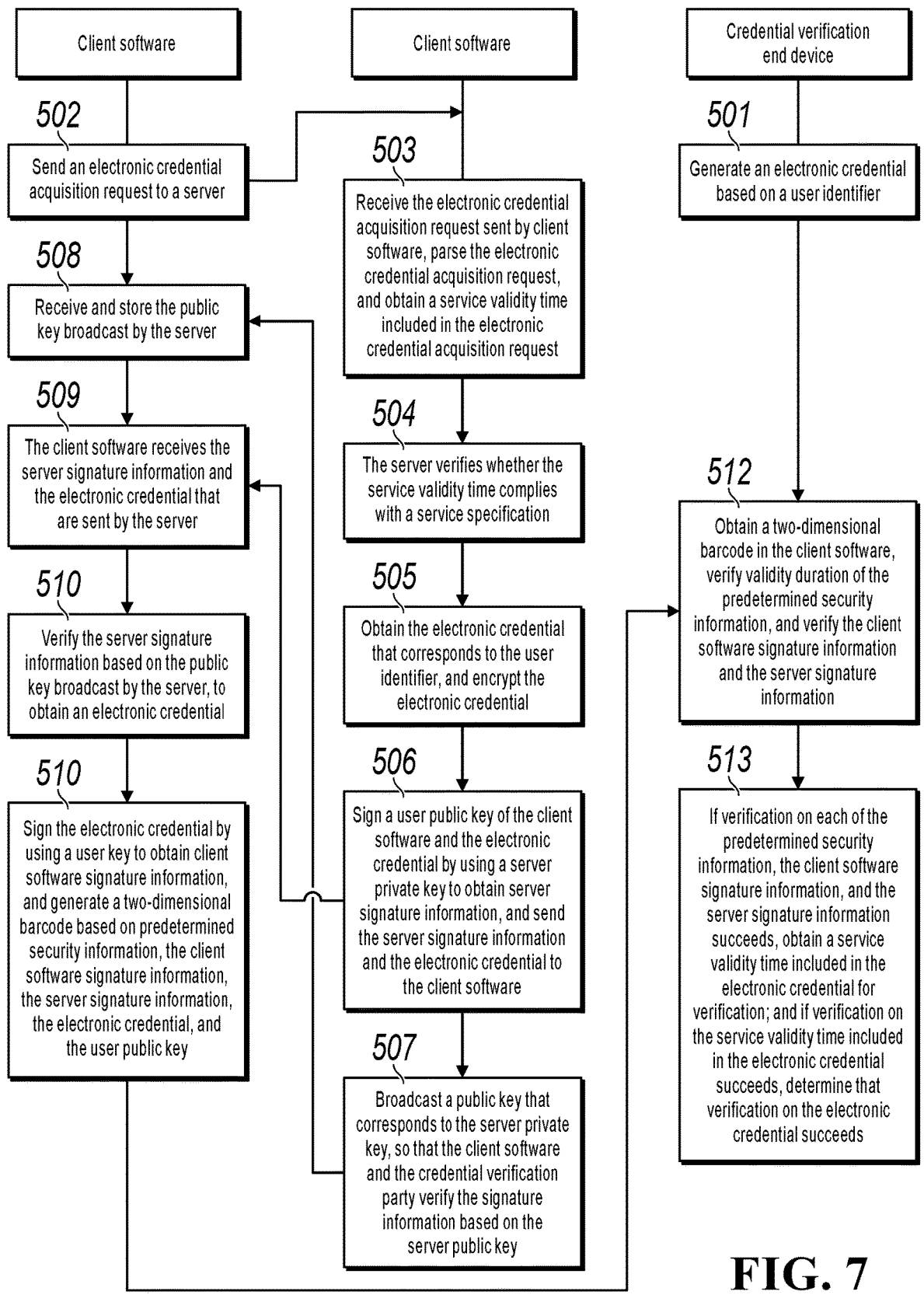
FIG. 7 is a flowchart illustrating a fifth method for processing two-dimensional barcodes, according to an implementation of the present invention.

In the previous implementations, processes that the server, the client software, and the credential verification end device processes the two-dimensional barcodes are separately described in detail. However, in practice, the server, the client software, and the credential verification end device are indispensable in verifying the two-dimensional barcode. In the following implementations, the server, the client software, and the credential verification end device are summarized and described. As shown in FIG. 7, the method includes the following steps.

501. The credential verification end device generates an electronic credential based on a user identifier, and synchronizes the corresponding electronic credential to the server based on the user identifier, so that the server sends the electronic credential to the client software.

502. The client software sends an electronic credential acquisition request to the server, where the electronic credential acquisition request includes a user identifier and a service validity time.

503. The server receives the electronic credential acquisition request sent by the client software, parses the electronic credential acquisition request, and obtains the service validity time included in the electronic credential acquisition request.

504. The server verifies whether the service validity time complies with a service specification.

If the service validity time complies with the service specification, step 505 is performed. If the service validity time does not comply with the service specification, the electronic credential acquisition request is ignored.

505. Obtain the electronic credential that corresponds to the user identifier, and encrypt the electronic credential.

The request information for obtaining an electronic credential can be further sent to the credential verification end device based on the user identifier to obtain the electronic credential.

506. The server signs a user public key of the client software and the electronic credential by using a server private key to obtain server signature information, and sends the server signature information and the electronic credential to the client software.

507. The server broadcasts a public key that corresponds to the server private key, so that the client software and the credential verification end device verify the signature information based on the server public key.

508. The client software receives and stores the public key broadcast by the server.

509. The client software receives the server signature information and the electronic credential that are sent by the server.

510. The client software verifies the server signature information based on the public key broadcast by the server, to obtain an electronic credential.

If the verification on the server signature information succeeds, step 511 is performed. If the verification on the server signature information fails, an electronic credential provided by the server cannot be obtained.

511. The client software signs the electronic credential by using a user key to obtain client software signature information, and generates a two-dimensional barcode based on predetermined security information, the client software signature information, the server signature information, the electronic credential, and the user public key.

512. The credential verification end device obtains a two-dimensional barcode in the client software, verifies validity duration of the predetermined security information, and verifies the client software signature information and the server signature information.

513. If verification on each of the predetermined security information, the client software signature information, and the server signature information succeeds, obtain a service validity time included in the electronic credential for verification; and if verification on the service validity time included in the electronic credential succeeds, determine that verification on the electronic credential succeeds.

It is worthwhile to note that for detailed descriptions of step 501 to step 513, references can be made to the previous related descriptions. Details are omitted for simplicity in this implementation of the present invention.

Further, as an implementation of the method shown in FIG. 1, another implementation of the present invention further provides a server. This apparatus implementation corresponds to the previous method implementation. For ease of reading, details in the previous method implementation are omitted in this apparatus implementation. However, it should be clear that the apparatus in this implementation can correspondingly implement all content in the previous method implementation.

Figure 8:
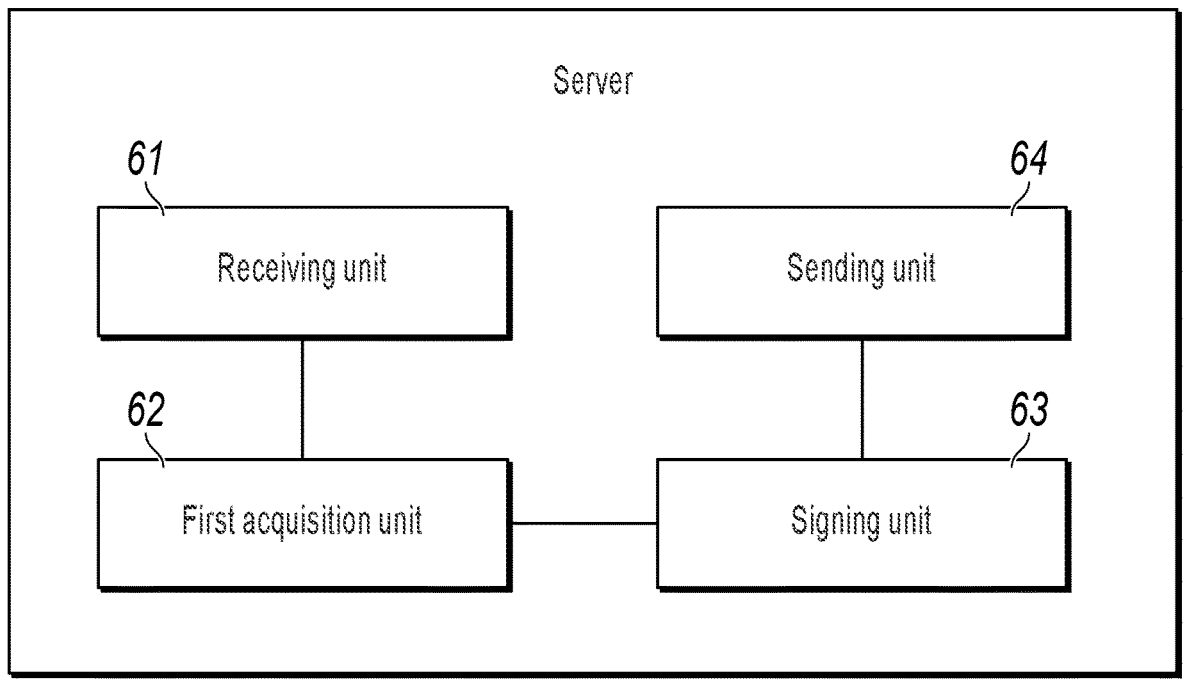
FIG. 8 is a block diagram illustrating a server, according to an implementation of the present invention.

Further, an implementation of the present invention provides a server. As shown in FIG. 8, the apparatus includes the following: a receiving unit 61, configured to receive an electronic credential acquisition request sent by client software, where the electronic credential acquisition request includes a user identifier; a first acquisition unit 62, configured to obtain an electronic credential that corresponds to the user identifier received by the receiving unit; a signing unit 63, configured to sign the electronic credential and a user public key of the client software by using a server private key to obtain server signature information; and a sending unit 64, configured to send the server signature information obtained by the signing unit 63 and the electronic credential obtained by the first acquisition unit to the client software, so that the client software verifies the server signature information within a validity time of a user key, and generates a two-dimensional barcode based on the electronic credential, so that a credential verification end device verifies the electronic credential included in the two-dimensional barcode, where the credential verification end device is configured to generate the electronic credential based on the user identifier.

Figure 9:
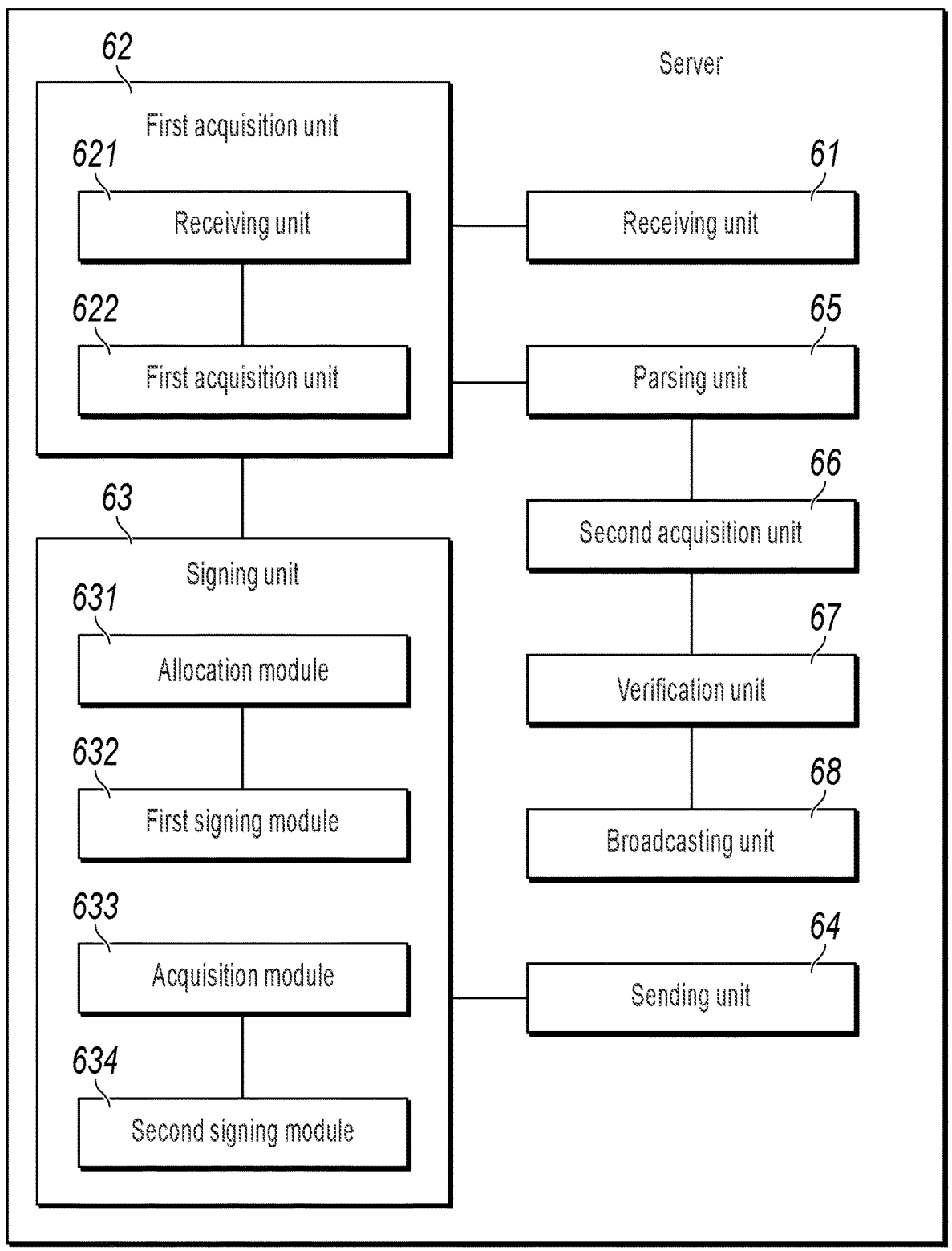
FIG. 9 is a block diagram illustrating another server, according to an implementation of the present invention.

Further, as shown in FIG. 9, the signing unit 63 includes the following: an allocation module 631, configured to allocate a user signature key to the electronic credential; a first signing module 632, configured to sign, by using the server private key, the electronic credential and a first user public key allocated by the allocation module, where the allocated user signature key includes the first user public key; an acquisition module 633, configured to obtain a second user public key sent by the client software; and a second signing module 634, configured to sign, by using the server private key, the electronic credential and the second user public key obtained by the acquisition module.

Further, if the first user public key is signed by using the server private key, the sending unit 64 is further configured to send the allocated user signature key, the server signature information, and the electronic credential to the client software.

Further, as shown in FIG. 9, the server further includes the following: a parsing unit 65, configured to: before the first acquisition unit 62 obtains the electronic credential that corresponds to the user identifier, parse the electronic credential acquisition request; a second acquisition unit 66, configured to: after the parsing unit 65 parses the electronic credential acquisition request, obtain a service validity time included in the electronic credential acquisition request; and a verification unit 67, configured to verify whether the service validity time obtained by the second acquisition unit 66 complies with a service specification, where the first acquisition unit 62 is further configured to: when the verification unit 67 verifies that the service validity time complies with the service specification, obtain the electronic credential that corresponds to the user identifier.

Further, as shown in FIG. 9, the first acquisition unit 62 includes the following: a receiving module 621, configured to: after the credential verification end device generates the electronic credential based on the user identifier, receive the electronic credential synchronized by the credential verification end device; and a processing module 622, configured to send request information for obtaining an electronic credential to the credential verification end device based on the user identifier, to obtain the electronic credential.

Further, the user signature key is an asymmetric key.

Further, as shown in FIG. 9, the server further includes the following: a broadcasting unit 68, configured to broadcast a public key that corresponds to the server private key, so that the client software and the credential verification end device verify the signature information based on the server public key.

Figure 10:
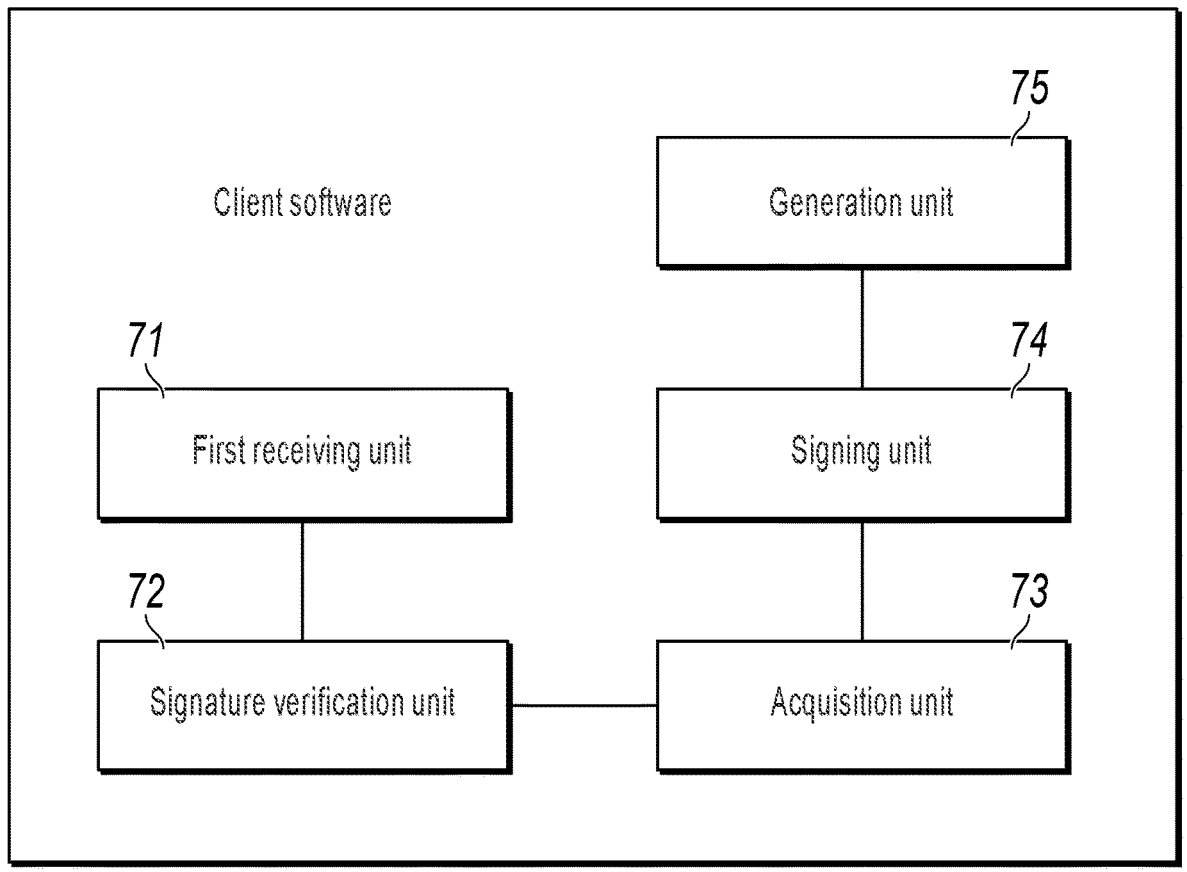
FIG. 10 is a block diagram illustrating client software, according to an implementation of the present invention.

An implementation of the present invention further provides client software. As shown in FIG. 10, the client software includes the following: a first receiving unit 71, configured to receive server signature information and an electronic credential that are sent by a server, where the server signature information is obtained by the server by signing the electronic credential and a user public key of the client software by using a server private key; a signature verification unit 72, configured to verify the server signature information to obtain an electronic credential; an acquisition unit 73, configured to obtain a user key that corresponds to the user public key; a signing unit 74, configured to sign the electronic credential by using the user key obtained by the acquisition unit 73 to obtain client software signature information; and a generation unit 75, configured to generate a two-dimensional barcode based on predetermined security information, the client software signature information, the server signature information, the electronic credential, and the user public key, so that a credential verification end device verifies the electronic credential included in the two-dimensional barcode based on the predetermined security information and the user public key, where the predetermined security information has validity duration, and the credential verification end device is configured to generate an electronic credential based on a user identifier.

Figure 11:
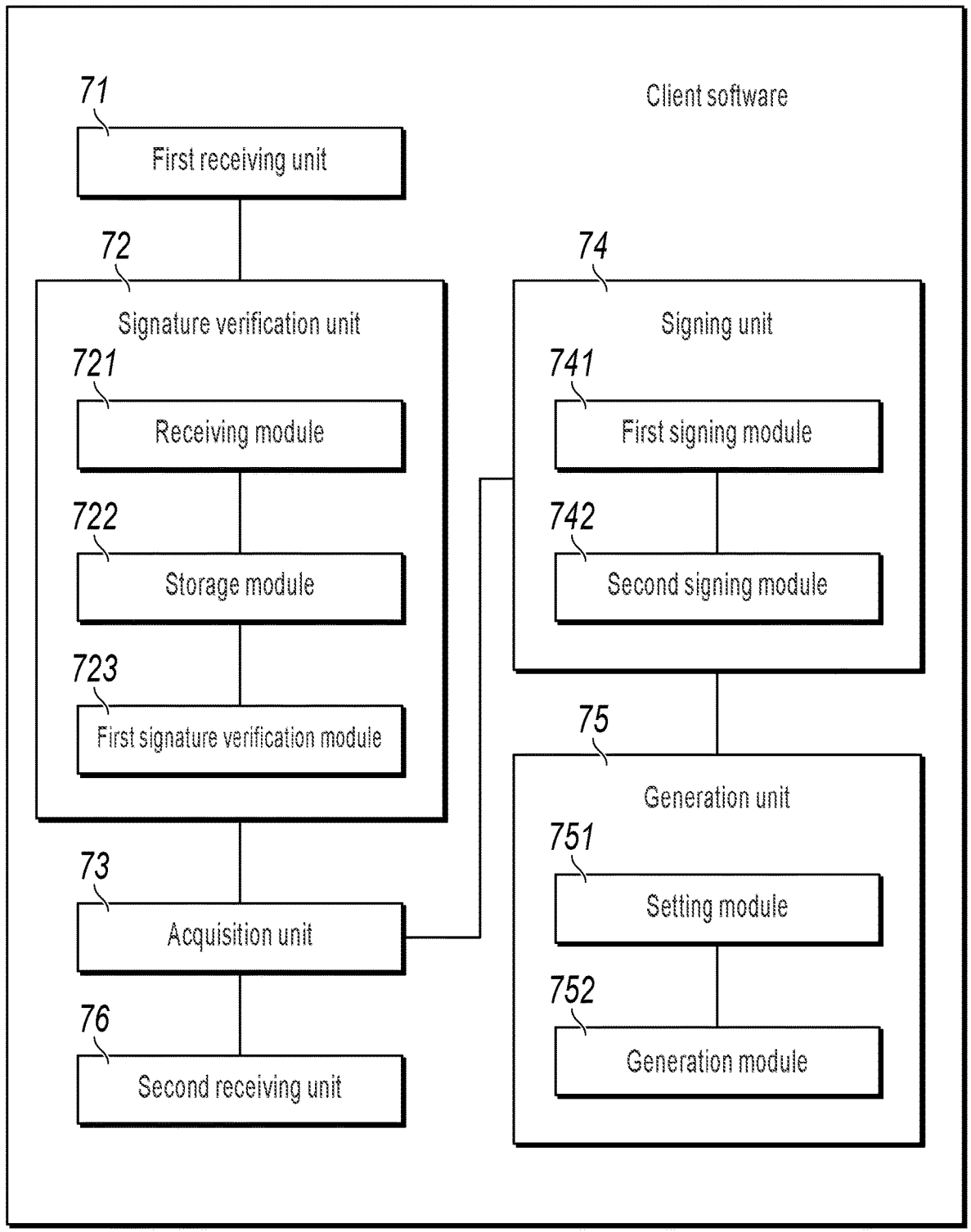
FIG. 11 is a block diagram illustrating another client software, according to an implementation of the present invention.

Further, as shown in FIG. 11, the client software further includes the following: a second receiving unit 76, configured to: before obtaining the user key that corresponds to the user public key, receive a user signature key allocated to the electronic credential and sent by the server.

The acquisition unit 73 is further configured to obtain a first user key included in the user signature key that is allocated by the server to the electronic credential and that is received by the second receiving unit.

The acquisition unit 73 is further configured to obtain a second user key generated by the client software and corresponding to the user public key.

Further, as shown in FIG. 11, the signing unit 74 includes the following: a first signing module 741, configured to sign the electronic credential by using the first user key; and a second signing module 742, configured to sign the electronic credential by using the second user key.

Further, as shown in FIG. 11, the signature verification unit 72 includes the following: a receiving module 721, configured to receive a server public key broadcast by the server; a storage module 722, configured to store the server public key received by the receiving module; and a first signature verification module 723, configured to verify the server signature information based on the server public key stored by the storage module, the client software public key, and the electronic credential.

Further, the user public key and the user key are asymmetric keys.

Further, as shown in FIG. 11, the generation unit 75 includes the following: a setting module 751, configured to set the validity duration of the predetermined security information; and a generation module 752, configured to generate the two-dimensional barcode based on the predetermined security information, the client software signature information, the server signature information, the electronic credential, the user public key, the validity duration of the predetermined security information, and the user identifier.

Figure 12:
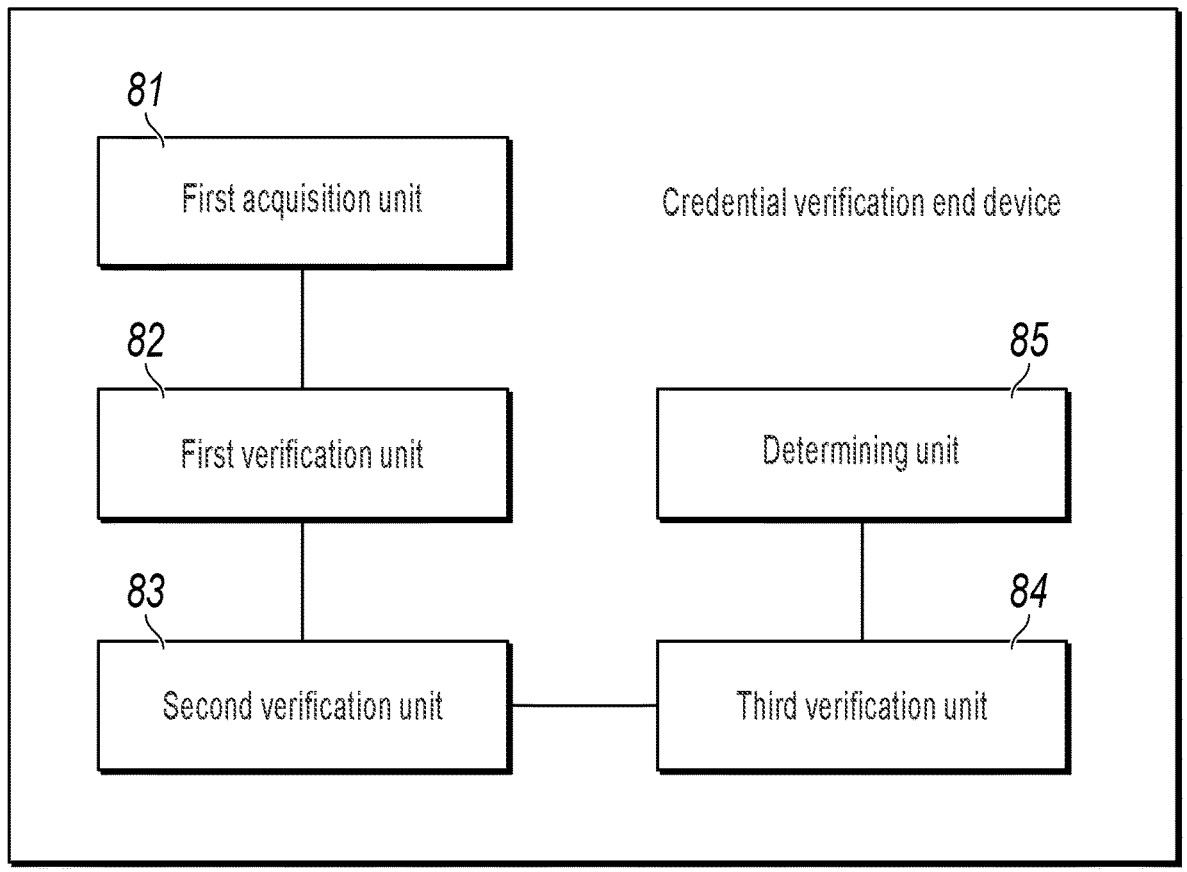
FIG. 12 is a block diagram illustrating a credential verification end device, according to an implementation of the present invention.

An implementation of the present invention further provides a credential verification end device. As shown in FIG. 12, the credential verification end device includes the following: a first acquisition unit 81, configured to obtain a two-dimensional barcode in client software, where the two-dimensional barcode is generated by the client software based on predetermined security information, client software signature information, server signature information, an electronic credential, and a user public key, the client software signature information is obtained by the client software by signing the electronic credential, and the server signature information is obtained by a server by signing the electronic credential and the user public key; a first verification unit 82, configured to verify validity duration of the predetermined security information obtained by the first acquisition unit; a second verification unit 83, configured to verify the client software signature information and the server signature information; a third verification unit 84, configured to obtain a service validity time included in the electronic credential for verification when verification of the first verification unit on the predetermined security information succeeds, verification of the second verification unit on each of the client software signature information and the server signature information succeeds; and a determining unit 85, configured to determine that verification on the electronic credential succeeds when verification of the third verification unit on the service validity time included in the electronic credential succeeds.

Figure 13:
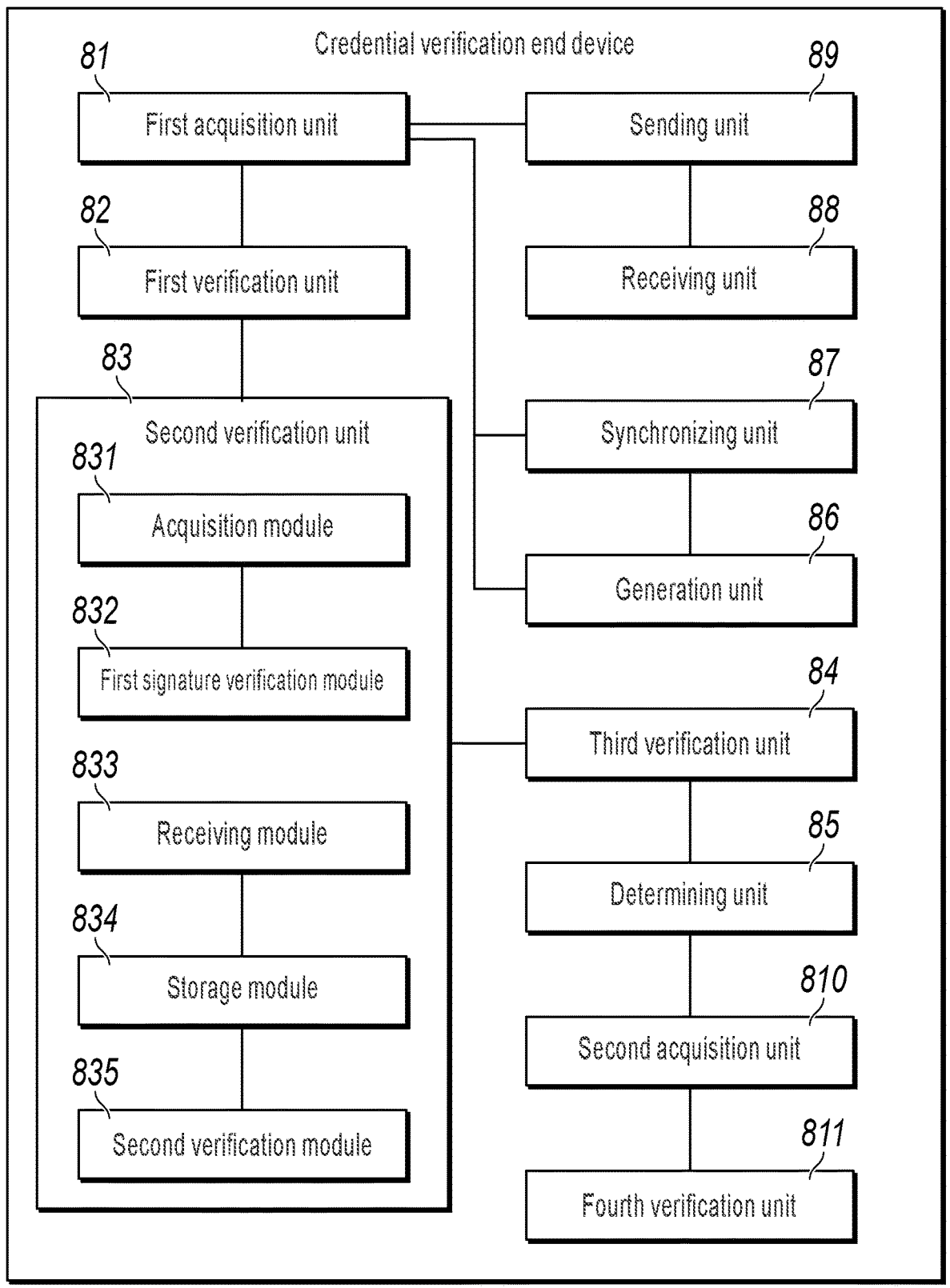
FIG. 13 is a block diagram illustrating another credential verification end device, according to an implementation of the present invention.

Further, as shown in FIG. 13, the credential verification end device further includes the following: a generation unit 86, configured to generate an electronic credential based on a user identifier before the first acquisition unit 81 obtains the two-dimensional barcode in the client software; a synchronizing unit 87, configured to synchronize the corresponding electronic credential to the server based on the user identifier, so that the server sends the electronic credential to the client software; a receiving unit 88, configured to receive request information for obtaining an electronic credential sent by the server; and a sending unit 89, configured to send the electronic credential to the server, where the request information for obtaining an electronic credential includes the user identifier.

Further, as shown in FIG. 13, the second verification unit 83 includes the following: an acquisition module 831, configured to obtain the user public key included in the two-dimensional barcode; a first signature verification module 832, configured to verify the client software signature information based on the user public key obtained by the acquisition module and the electronic credential; a receiving module 833, configured to receive a server public key corresponding to a server private key and broadcast by the server; a storage module 834, configured to store the server public key received by the receiving module; and a second verification module 835, configured to verify the server signature information based on the server public key stored by the storage module, the client software public key, and the electronic credential.

Further, as shown in FIG. 13, the credential verification end device further includes the following: a second acquisition unit 810, configured to: before the determining unit 85 determines that the verification on the electronic credential succeeds, obtain the user identifier included in the two-dimensional barcode; and a fourth verification unit 811, configured to verify the user identifier obtained by the second acquisition unit 810.

The determining unit 85 is further configured to: when the fourth verification unit 811 determines that the verification on the user identifier succeeds, determine that the verification on the electronic credential succeeds.

Figure 14:
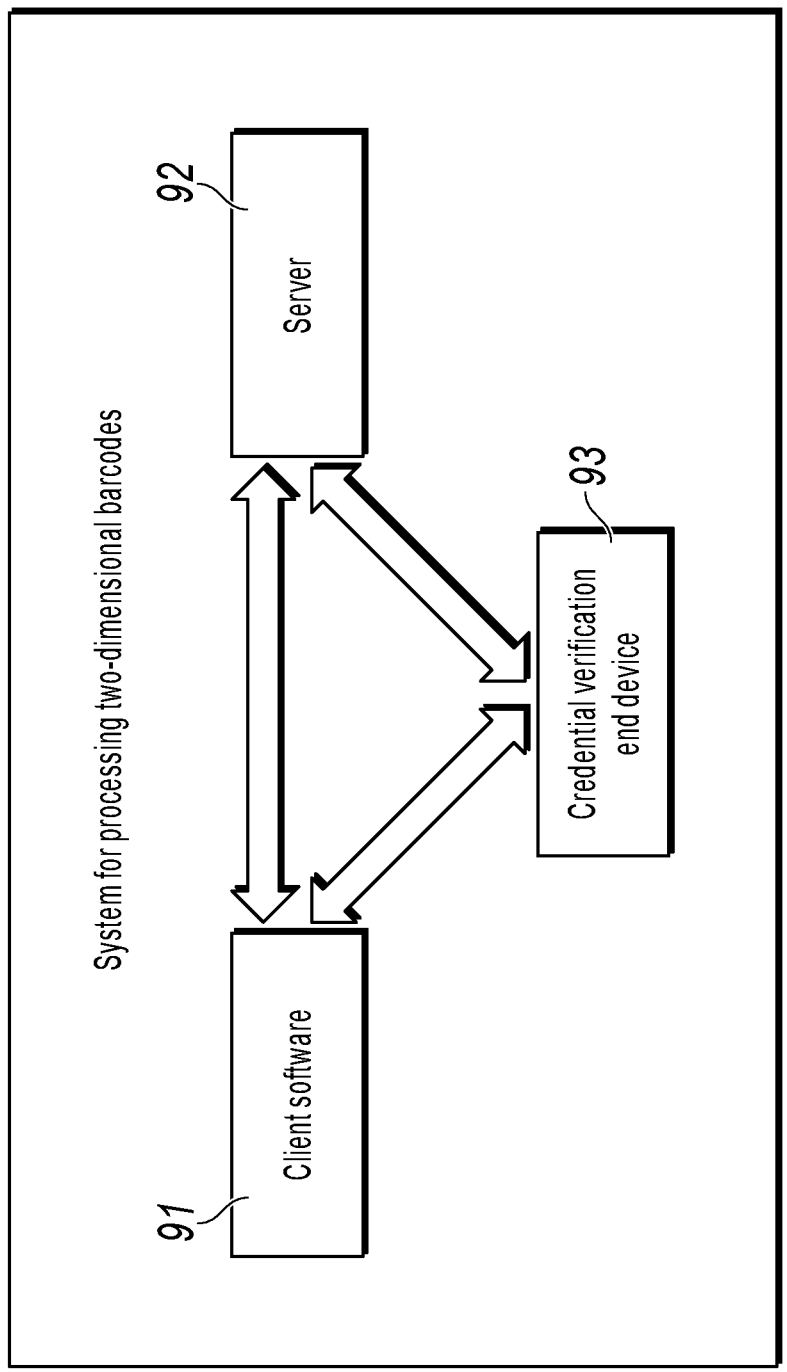
FIG. 14 is a block diagram illustrating a system for processing two-dimensional barcodes, according to an implementation of the present invention.

Further, as shown in FIG. 14, an implementation of the present invention further provides a system for processing two-dimensional barcodes, and the system includes the following: client software 91, configured to send an electronic credential acquisition request to a server 92, where the electronic credential acquisition request includes a user identifier; the server 92, configured to receive the electronic credential acquisition request sent by the client software 91, and obtain an electronic credential from a credential verification end device 93 based on the user identifier; and the credential verification end device 93, configured to receive and respond to request information for obtaining an electronic credential sent by the server 92, and send the electronic credential to the server 92.

The server 92 is further configured to receive the electronic credential sent by the credential verification end device 93, sign the electronic credential and a user public key of the client software 91 to obtain server 92 signature information, and send the server 92 signature information and the electronic credential to the client software 91.

The client software 91 is configured to receive the server 92 signature information and the electronic credential that are sent by the server 92, verify the server 92 signature information to obtain the electronic credential, obtain a user key that corresponds to the user public key, sign the electronic credential by using the user key to obtain client software 91 signature information, and generate a two-dimensional barcode based on predetermined security information, the client software 91 signature information, the server 92 signature information, the electronic credential, and the user public key.

The credential verification end device 93 is configured to obtain the two-dimensional barcode in the client software 91, verify validity duration of the predetermined security information, and verify the client software 91 signature information and the server 92 signature information; and if verification on each of the predetermined security information, the client software 91 signature information, and the server 92 signature information succeeds, obtain a service validity time included in the electronic credential for verification, and if verification on the service validity time included in the electronic credential succeeds, determine that verification on the electronic credential succeeds.

According to the server, the client software, the credential verification end device, the system for processing two-dimensional barcodes provided in the present invention, after receiving the electronic credential acquisition request sent by the client software, the server signs the electronic credential and the user public key of the client software by using the server private key to obtain the server signature information, and sends the server signature information and the electronic credential to the client software. The client software receives the server signature information and the electronic credential that are sent by the server, verifies the server signature information, after the verification on the signature information succeeds, signs the electronic credential, and generates the two-dimensional barcode based on the predetermined security information, the client software signature information, the server signature information, the electronic credential, and the user public key. After obtaining the two-dimensional barcode, the credential verification end device can verify the server signature information, the client software signature information, and the predetermined security information in the two-dimensional barcode to determine whether the electronic credential is tampered with in a transmission process, to ensure security of the electronic credential in a use process.

In the previous implementations, the description of each implementation has respective focuses. For a part not described in detail in an implementation, references can be made to related descriptions in other implementations.

It can be understood that related features in the previous method and apparatus can be mutually referenced. In addition, "first", "second", etc. in the previous implementation are used to distinguish between implementations, and do not represent advantages and disadvantages of each implementation.

A person skilled in the art can clearly understand that for the convenience and brevity of the description, for a specific working process of the system, the apparatus, and the unit described above, references can be made to a corresponding process in the previous method implementations, and details are omitted for simplicity in the implementation of the present invention.

The algorithm and display provided here are not inherently related to any particular computer, virtual system, or other devices. Various general-purpose systems can also be used together with the instruction based here. Based on the above description, the structure needed for constructing such a system is obvious. Furthermore, the present invention does not apply to any particular programming language. It should be understood that the content of the present invention described here can be implemented by using various programming languages, and the previous description of a detailed language is used to disclose the best implementation of the present invention.

A large number of details are provided in the specification. However, it can be understood that the implementations of the present invention can be practiced without these details. In some instances, well-known methods, structures, and technologies are not shown in detail, so as not to blur the understanding of the present specification.

Similarly, it should be understood that, to streamline the present disclosure and help understand one or more of various inventive aspects, the features of the present invention are sometimes grouped together into a single implementation, drawing, or description of the present invention. However, the disclosed method should not be interpreted as reflecting the following intention: That is, the claimed disclosure requires more features than the features specified in each claim. More accurately, as reflected in the claims below, the inventive aspects are less than all features of a single implementation previously disclosed. Therefore, the claims that follow a detailed implementation definitely incorporate the detailed implementation. Each claim serves as a separate implementation of the present invention.

A person skilled in the art can understand that modules in the devices in the implementations can be adaptively changed and disposed in one or more devices different from the implementations. Modules or units or components in the implementations can be combined into one module or unit or component, and can additionally be divided into a plurality of submodules or subunits or subcomponents. Except a fact that at least some of these features and/or processes or units are mutually exclusive, all disclosed features and all processes or units of any method or device that are disclosed in such a method in the specification (including the appended claims, the abstract, and the accompanying drawings) can be combined in any combination mode. Unless otherwise explicitly stated, each feature disclosed in the specification (including the appended claims, the abstract, and the accompanying drawings) can be replaced by an alternative feature that serves same, equivalent, or similar purposes.

In addition, a person skilled in the art can understand that, although some implementations described here include some features included in another implementation instead of including another feature, a combination of features of different implementations means falling within the scope of the present invention and forming different implementations. For example, in the following claims, any one of the contemplated implementations can be used in any combination mode.

Implementations of various parts in the present invention can be implemented by hardware, or software modules running on one or more processors, or a combination thereof. A person skilled in the art should understand that a microprocessor or a digital signal processor (DSP) can be used in practice to implement some or all of the functions of some or all of the components of the disclosure name (for example, an apparatus for processing two-dimensional barcodes) based on an implementation of the present invention. The present invention can also be implemented as a device or apparatus program (e.g., computer program and computer program product) for executing a part or all of the methods described here. Such a program for implementing the present invention can be stored in a computer-readable medium, or can have a form of one or more signals. Such a signal can be downloaded from an Internet website, or provided on a carrier signal, or provided in any other form.

It is worthwhile to note that the previous implementations are intended for describing the present invention, instead of limiting the present invention, and a person skilled in the art can design an alternative implementation without departing from the scope of the appended claims. In the claims, any reference symbol located between brackets should not be constructed as a limitation on the claims. The word "include" does not exclude the existence of elements or steps not listed in the claims. The word "one" or "a/an" before the element does not exclude the presence of a plurality of such elements. The present invention can be implemented by hardware including several different elements and a computer that is appropriately programmed. In the unit claims enumerating several apparatuses, several of these apparatuses can be embodied by using the same hardware item. The use of words "first", "second", and "third" does not indicate any sequence. These words can be interpreted as names.

Figure 15:
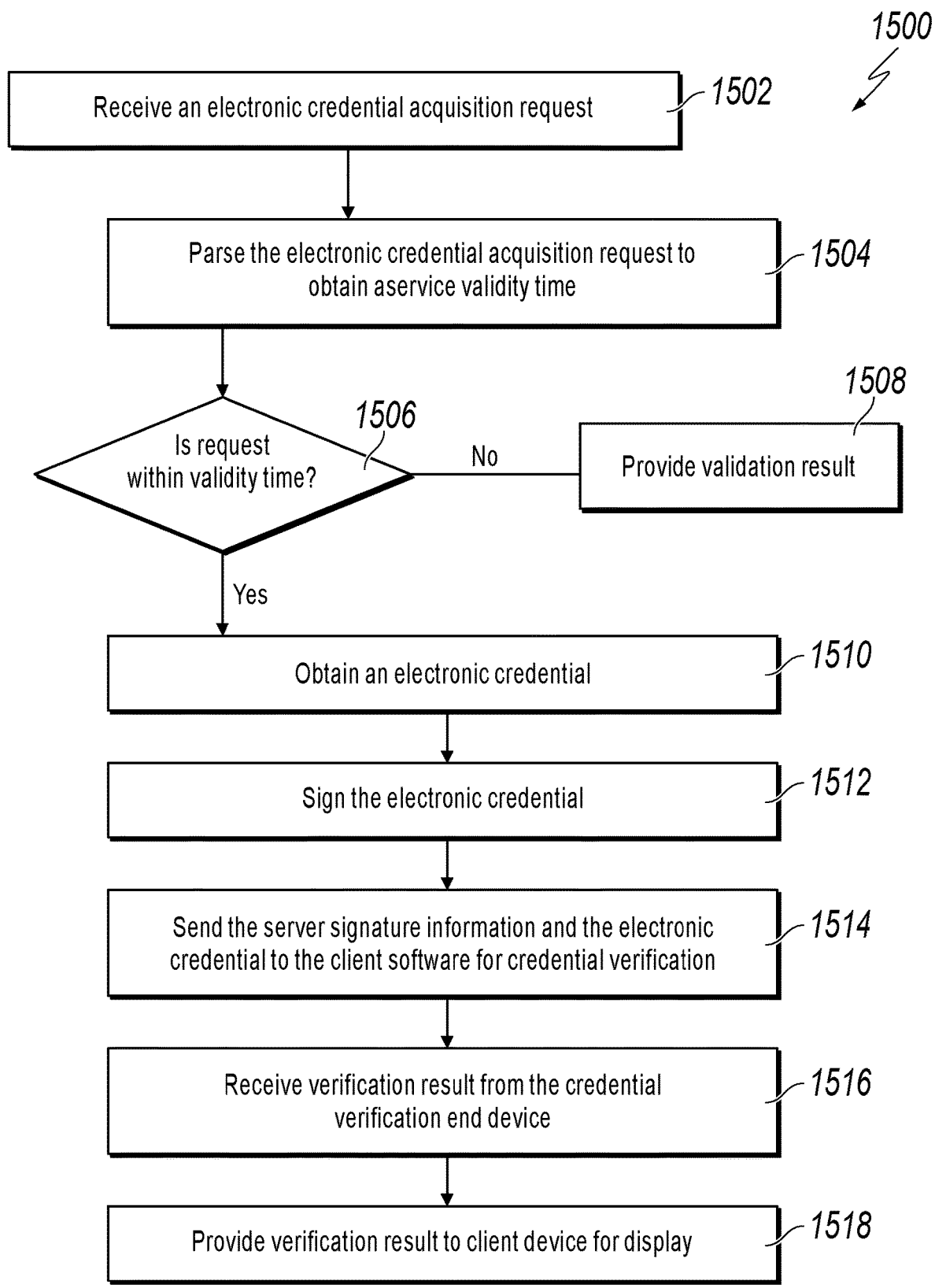
FIG. 15 is a flowchart illustrating an example of a computer-implemented method for processing a service request, according to an implementation of the present disclosure.

FIG. 15 is a flowchart illustrating an example of a computer-implemented method 1500 for processing a service request, according to an implementation of the present disclosure. For clarity of presentation, the description that follows generally describes method 1500 in the context of the other figures in this description. However, it will be understood that method 1500 can be performed, for example, by any system, environment, software, and hardware, or a combination of systems, environments, software, and hardware, as appropriate. In some implementations, various steps of method 1500 can be run in parallel, in combination, in loops, or in any order.

At 1502, an electronic credential acquisition request is received, by a server. The electronic credential acquisition request is sent by client (e.g., client device or client software), for example, in response to a user input including a service request. In some implementations, the user input includes scanning of an electronic credential card to request a service (for example, a transaction service or a facility entry service). The card can be scanned using a client application executed by a client device (for example, a smart wearable device, a portable device, or a computer). The electronic credential card includes a user identifier. In some implementations, the electronic credential card can include a transportation pass (for example, an air ticket, a bus ticket or a train ticket), an event access ticket (for example, a concert ticket), a bankcard, an access control card, an entertaining facility admission ticket (for example, a park admission ticket, a park admission ticket, or a museum admission ticket), an identity card, a merchant coupon, a membership card, a driving license, a driving license access control card, or a bus card. From 1502, method 1500 proceeds to 1504.

At 1504, the electronic credential acquisition request is parsed by using a parsing algorithm. The parsing algorithm can be associated with a type of the electronic credential or a type of service request that can be associated with multiple types of electronic credentials. The parsing results can include user information (for example, a user identifier, a user name, a user phone number, a user account number, a user signature) and a service validity time included in the electronic credential acquisition request (for example, a duration during which the requested service can be provided). In some implementations, the validity duration of the predetermined security information is determined based on a type of the electronic credential. From 1504, method 1500 proceeds to 1506.

At 1506, it is determined whether the service request is within a valid time. For example, a current date and time are compared to an expiration threshold of the electronic credential. In some implementations, the validation includes one or more additional validation parameters (for example, frequency of use within a valid time). If it is determined that the service request is not valid, from 1506, method 1500 proceeds to 1508.

At 1508, validation failure results are provided to the client to be displayed to the user requesting the service.

If it is determined that the service request is valid, from 1506, method 1500 proceeds to 1510.

At 1510, an electronic credential that corresponds to the user identifier is obtained. In some implementations, after the credential verification end device generates the electronic credential based on the user identifier, the electronic credential is synchronized by the credential verification end device. In some implementations, a request for information is sent to the credential verification end device for obtaining the electronic credential based on the user identifier to obtain the electronic credential. From 1510, method 1500 proceeds to 1512.

At 1512, the electronic credential and a user public key of the client are signed by using a server private key to obtain server signature information. In some implementations, a user signature key is allocated to the electronic credential. The allocated user signature key used for signing can include the first user public key. In some implementations, a second user public key is sent by the client. Signing the electronic credential and the second user public key can be performed by using the server private key, a user public key, and a user private key. The user private key can include asymmetric keys or symmetric keys. In some implementations, signing the electronic credential can be performed using a hash operation on the user public key and the electronic credential. The hash operation can include execution of a hash algorithm to obtain a hash value and signing the hash value by using the server private key to obtain the server signature information. From 1512, method 1500 proceeds to 1514.

At 1514, the server signature information and the electronic credential are sent to the client. The client can use the server signature information and the electronic credential to verify the server signature information and to generate a transmittal signal. The transmission of the server signature information and the electronic credential can be based on near field communication (NFC), WiFi, 3G/4G/5G, a POS card swiping technology, a two-dimensional code scanning technology, a barcode scanning technology, Bluetooth, infrared, a short message service (SMS), a multimedia message service (MMS), a two-dimensional code, a barcode, a character code (for example, a 2D barcode structure). For example, the barcode can be based on the electronic credential to enable a credential verification end device to verify the electronic credential included in the two-dimensional barcode. The credential verification end device can be configured to generate the electronic credential based on the user identifier. In some implementations, the 2D barcode structure can include at least one of a header field, a version filed, and a verification field. The header field can be used to indicate a developer of the 2D barcode structure. The version filed can be used to indicate a version of the 2D barcode structure. The verification field can be used to perform content verification on, for example, one or more fields in the 2D barcode structure. Based on different service scenarios, adjustments can be made to the barcode fields, to generate a 2D barcode applicable to one or more service scenarios. Corresponding services can be performed based on the 2D barcode. As a result, the unique 2D barcode information structure is flexible and scalable, thereby improving service request processing when using 2D barcodes. From 1514, method 1500 proceeds to 1516.

At 1516, verification result is received from the credential verification end device. The verification result can include a binary code corresponding to a confirmation that the requested service is granted and initiated or an indication that the requested service is unavailable or rejected. From 1516, method 1500 proceeds to 1518.

At 1518, the verification result is provided for display by a graphical user interface of the client. After 1518, method 1500 stops.

Implementations of the present application can solve technical problems in processing a service request. For example, the usage of signed electronic credential in near field communication provides immutable and tamper-resistant data transfer and storage, and the data is stored in a database of the server in an encrypted form. Such security measures ensure that user data is not corrupted or altered by malicious processes. For example, an alteration of an asset-receiving object can be a tactic used by an attacker when a target user is compromised for fraudulent purposes, and transmission of encrypted user data prevents the use of that tactic by an attacker. In some implementations, user information and service data from different sources are matched with each other for ensure validity and to further ensure the integrity of the service data request. In addition, the processing of the service requests and the transfer of server signature information and the electronic credential is configured such that it does not affect the overall data volume within the server. For example, the server can be configured to delete a data volume corresponding to the server signature information and the electronic credential in response to completion of the data transmission or in response to receipt of the verification results. As such, the processing of the service requests does not lead to an exponential increase of data volume, which is a common problem associated with conventional methods of service processing.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for processing service requests, the computer-implemented method comprising:
    receiving, by one or more processors, an electronic credential request from a client, wherein the electronic credential request comprises a user identifier;
    retrieving, by the one or more processors, an electronic credential that corresponds to the user identifier;
    retrieving, by the one or more processors, at least one user public key that corresponds to the client, the at least one user public key having been temporarily allocated by a server to the electronic credential;
    performing, by the one or more processors, a hash operation on the at least one user public key and the electronic credential by using a hash algorithm to obtain a hash value;
    signing, by the one or more processors, within a predetermined time period, the hash value by using a server private key to generate a hashed credential;
    generating, by the one or more processors, server signature information, using the hashed credential; and
    transmitting, by the one or more processors, the server signature information and the electronic credential to the client, wherein the server signature information is cryptographically verifiable, by the client, within the predetermined time period and enables the client to generate a two-dimensional barcode based on the electronic credential, wherein the electronic credential included in the two-dimensional barcode is verifiable by a credential verification device that generates the electronic credential based on the user identifier.

2. The computer-implemented method of claim 1, wherein the at least one user public key comprises a first user public key and the computer-implemented method further comprises:
    allocating a user signature key to the electronic credential, and signing the electronic credential and the first user public key by using the server private key, wherein the user signature key comprises the first user public key.

3. The computer-implemented method of claim 2, wherein the at least one user public key comprises a second user public key and the computer-implemented method further comprises:
    obtaining the second user public key sent by the client, and signing the electronic credential and the second user public key by using the server private key.

4. The computer-implemented method of claim 2, wherein the user signature key is an asymmetric key.

5. The computer-implemented method of claim 3, wherein the first user public key is signed by using the server private key, transmitting the server signature information and the electronic credential to the client comprises:

transmitting at least one user public key, the server signature information, and the electronic credential to the client.

6. The computer-implemented method of claim 1, further comprising:

determining a service validity time based on the electronic credential request; and verifying whether the service validity time complies with a service specification.

7. The computer-implemented method of claim 6, wherein the service validity time is based on a type of the electronic credential.

8. A non-transitory, computer-readable medium storing one or more instructions executable by a computer system to perform operations comprising:

receiving an electronic credential request from a client, wherein the electronic credential request comprises a user identifier;

retrieving an electronic credential that corresponds to the user identifier;

retrieving at least one user public key that corresponds to the client, the at least one user public key having been temporarily allocated by a server to the electronic credential;

performing a hash operation on the at least one user public key and the electronic credential by using a hash algorithm to obtain a hash value;

signing within a predetermined time period, the hash value by using a server private key to generate a hashed credential;

generating server signature information, using the hashed credential; and transmitting the server signature information and the electronic credential to the client, wherein the server signature information is cryptographically verifiable, by the client, within the predetermined time period and enables the client to generate a two-dimensional barcode based on the electronic credential, wherein the electronic credential included in the two-dimensional barcode is verifiable by a credential verification device that generates the electronic credential based on the user identifier.

9. The non-transitory, computer-readable medium of claim 8, wherein the at least one user public key comprises a first user public key and the operations further comprise:

allocating a user signature key to the electronic credential, and signing the electronic credential and the first user public key by using the server private key, wherein the user signature key comprises the first user public key.

10. The non-transitory, computer-readable medium of claim 8, wherein the at least one user public key comprises a second user public key and the operations further comprise:

obtaining the second user public key sent by the client, and signing the electronic credential and the second user public key by using the server private key.

11. The non-transitory, computer-readable medium of claim 9, wherein the user signature key is an asymmetric key.

12. The non-transitory, computer-readable medium of claim 10, wherein the first user public key is signed by using the server private key, transmitting the server signature information and the electronic credential to the client comprises:

transmitting at least one user public key, the server signature information, and the electronic credential to the client.

13. The non-transitory, computer-readable medium of claim 8, further comprising:

determining a service validity time based on the electronic credential request; and verifying whether the service validity time complies with a service specification.

14. A computer-implemented system, comprising:

one or more computers; and one or more computer memory devices interoperably coupled with the one or more computers and a having tangible, non-transitory, machine-readable media storing one or more instructions that, when executed by the one or more computers, cause the one or more computers to perform one or more operations comprising:

receiving an electronic credential request from a client, wherein the electronic credential request comprises a user identifier;

retrieving an electronic credential that corresponds to the user identifier;

retrieving at least one user public key that corresponds to the client, the user public key having been temporarily allocated by a server to the electronic credential;

performing a hash operation on the at least one user public key and the electronic credential by using a hash algorithm to obtain a hash value;

signing within a predetermined time period, the hash value by using a server private key to generate a hashed credential;

generating server signature information, using the hashed credential; and transmitting the server signature information and the electronic credential to the client, wherein the server signature information is cryptographically verifiable, by the client, within the predetermined time period and enables the client to generate a two-dimensional barcode based on the electronic credential, wherein the electronic credential included in the two-dimensional barcode is verifiable by a credential verification device that generates the electronic credential based on the user identifier.

15. The computer-implemented system of claim 14, wherein the at least one user public key comprises a first user public key and the operations further comprise:

allocating a user signature key to the electronic credential, and signing the electronic credential and the first user public key by using the server private key, wherein the user signature key comprises the first user public key.

16. The computer-implemented system of claim 14, wherein the at least one user public key comprises a second user public key and the operations further comprise:

obtaining a second user public key sent by the client, and signing the electronic credential and the second user public key by using the server private key.

17. The computer-implemented system of claim 15, wherein the user signature key is an asymmetric key.

18. The computer-implemented system of claim 17, wherein the first user public key is signed by using the server private key, transmitting the server signature information and the electronic credential to the client comprises:

transmitting the user at least one user public key, the server signature information, and the electronic credential to the client.

19. The computer-implemented system of claim 14, further comprising:
    determining a service validity time based on the electronic credential request; and
    verifying whether the service validity time complies with a service specification.

* * * * *

UNITED STATES PATENT AND TRADEMARK OFFICE
CERTIFICATE OF CORRECTION

PATENT NO. : 11,336,435 B2
APPLICATION NO. : 17/341188
DATED : May 17, 2022
INVENTOR(S) : Shen et al.

It is certified that error appears in the above-identified patent and that said Letters Patent is hereby corrected as shown below:

In the Claims

Column 34, Line 14, in Claim 14, delete "a having" and insert -- having a --.

Column 34, Line 61, in Claim 18, delete "claim 17," and insert -- claim 16, --.

Column 34, Line 65, in Claim 18, delete "the user at" and insert -- at --.

Signed and Sealed this
Thirteenth Day of September, 2022

Katherine Kelly Vidal
*Director of the United States Patent and Trademark Office*